US 11,791,668 B2

United States Patent
Umeno et al.

(10) Patent No.: US 11,791,668 B2
(45) Date of Patent: Oct. 17, 2023

(54) POWER SUPPLY DEVICE AND POWER SUPPLY SYSTEM

(71) Applicants: KYOTO UNIVERSITY, Kyoto (JP); MINNA-DENRYOKU, INC., Tokyo (JP)

(72) Inventors: Ken Umeno, Kyoto (JP); Eiji Oishi, Tokyo (JP); Yoshitaka Nishimura, Tokyo (JP)

(73) Assignees: KYOTO UNIVERSITY, Kyoto (JP); MINNA-DENRYOKU, INC., Tokyo (JP)

( * ) Notice: Subject to any disclaimer, the term of this patent is extended or adjusted under 35 U.S.C. 154(b) by 168 days.

(21) Appl. No.: 17/439,128

(22) PCT Filed: Mar. 13, 2020

(86) PCT No.: PCT/JP2020/011300
§ 371 (c)(1),
(2) Date: Sep. 14, 2021

(87) PCT Pub. No.: WO2020/189591
PCT Pub. Date: Sep. 24, 2020

(65) Prior Publication Data
US 2022/0149670 A1    May 12, 2022

(30) Foreign Application Priority Data
Mar. 15, 2019  (JP) .................... 2019-048219

(51) Int. Cl.
*H02J 50/80*  (2016.01)
*H02J 50/12*  (2016.01)
(Continued)

(52) U.S. Cl.
CPC .......... *H02J 50/80* (2016.02); *H02J 50/12* (2016.02); *H02J 50/40* (2016.02); *H04B 1/69* (2013.01)

(58) Field of Classification Search
CPC ............. H02J 50/00; H02J 50/80; H04B 5/00
See application file for complete search history.

(56) References Cited

U.S. PATENT DOCUMENTS 6,393,047 B1 *   5/2002   Popovic' ............... H04B 1/707
                                                            370/441
9,755,699 B2     9/2017   Masaoka
(Continued)

FOREIGN PATENT DOCUMENTS

JP     2011-525789 A    9/2011
JP       5116904 B1    10/2012
(Continued)

OTHER PUBLICATIONS

International Search Report dated May 19, 2020 from corresponding International Patent Application No. PCT/JP2020/011300, 3 pages.
(Continued)

*Primary Examiner* — Adi Amrany
(74) *Attorney, Agent, or Firm* — Ohlandt, Greeley and Perle, LLP

(57) ABSTRACT

It is aimed to provide a power supply device and a power supply system which enable consumers to freely choose electrical power and specify transmission sources when receiving electrical power, and enable parties involved in transactions (power supply side and power receiving side) to reliably and safely perform transmission between them. There are provided a power supply device and a power supply system. The power supply device includes a baseband unit that generates a power signal, a modulation processing unit that modulates the power signal generated
(Continued)

by the baseband unit to impart a code thereto for specifying a transmission source of the power signal and generates a modulated signal that can be demodulated by a power receiving device, and a transmission unit that transmits the modulated signal generated by the modulation processing unit.

20 Claims, 32 Drawing Sheets

(51) Int. Cl.
*H02J 50/40* (2016.01)
*H04B 1/69* (2011.01)

(56) References Cited

U.S. PATENT DOCUMENTS

| | | | |
|---|---|---|---|
| 2004/0146095 A1* | 7/2004 | Umeno | H04J 13/0018 375/150 |
| 2009/0304101 A1 | 12/2009 | LoPorto et al. | |
| 2017/0117913 A1 | 4/2017 | Yamamoto et al. | |
| 2020/0067348 A1 | 2/2020 | Yamamoto et al. | |

FOREIGN PATENT DOCUMENTS

| | | |
|---|---|---|
| JP | 5131550 B2 | 11/2012 |
| JP | 2014-138452 A | 7/2014 |
| JP | 2016-192846 A | 11/2016 |
| JP | 2017-85871 A | 5/2017 |
| JP | 2017-118237 A | 6/2017 |
| JP | 2017-121007 A | 7/2017 |
| JP | 2018-156540 A | 10/2018 |
| WO | 2018/105695 A1 | 6/2018 |

OTHER PUBLICATIONS

Written Opinion dated May 19, 2020 from corresponding International Patent Application No. PCT/JP2020/011300, 6 pages.
Nikkei Business Online Nikkei Energy Next (Mar. 19, 2018), Eneris launches power blockchain on Minden. https://business.nikkeibp.co.jp/atcl/report/16/022700115/031500093/ (accessed Oct. 28, 2018).
Isao Nakazawa, Ken Umeno, Performance evaluation of satellite communication system using almost periodic frequency arrangement, IEICE Tech. Rep., vol. 115, pp. 75-79, Nov. 2015.
Takehiro Imura, Yoichi Hori, Unified Theory of Electromagnetic Induction and Magnetic Resonant Coupling, IEEJ Transactions on Industry Applications, 135(6), pp. 697-710, Jun. 2015.
Isao Nakazawa, Ken Umeno, Performance Evaluation of Wideband Radio Communication Systems using Almost Periodic Frequency Arrangement, Authorized licensed use limited to: Kyoto University. Downloaded on Jun. 25, 2021 at 14:03:57 UTC from IEEE Xplore. Restrictions apply.

* cited by examiner (a)

(b)

(a)

(b)

(a)

(b)

(a)

(b)

(c)

(a)

(b)

(A)

(B)

POWER SUPPLY DEVICE AND POWER SUPPLY SYSTEM

TECHNICAL FIELD

The disclosure of the present specification relates to power supply devices which transmit a power signal to a power receiving device to supply electrical power thereto and which transmit or receive data related to the signal transmission, and also relates to power supply systems including the power supply devices.

BACKGROUND ART

With the deregulation of retail electrical power, the active use of renewable sources of electrical power is progressing. In order to further promote use thereof, systems that allow consumers to freely choose power suppliers may be required. Accordingly, specifying power supply sources (power transmission sources) is an important technical issue when producing such systems.

However, when electrical power from different transmission sources is sent to an electrical power network for supply to consumers, the electrical power of these different transmission sources is pooled together. Therefore, consumers cannot specify the transmission sources of the electrical power.

As measures against this, there has been proposed an electrical power transaction platform (e.g., see NPTL 1). According to this, a token that is a digital certificate is issued to certify generated electrical energy and consumed electrical energy, and the transaction history between the power producer and the consumer is recorded on a blockchain ledger, so that, by referring to the ledger, the electrical power source from which the consumer procured the electrical power and the consumer to which the power producer supplied the electrical power can be confirmed.

In recent power supply technology, attention is being drawn to contactless power supply using wireless power transmission. Discussions for system designs compatible with wireless electrical appliances, that is, wireless power receiving devices, are underway in the Ministry of Internal Affairs and Communications, and it is expected that the number of power receiving devices compatible with contactless power supply will increase in the future. Taking an example in which a power receiving device is located on the boundary between the regions (power supply areas) where a plurality of power supply devices can supply electrical power, in such a situation, it is necessary to adopt a system enabling the power receiving device to properly choose any one of the plurality of power supply devices according to the power supply conditions and the power receiving conditions.

In this regard, there has been proposed a contactless power supply system (e.g., see PTL 1). According to this system, a power receiving device transmits the required quantity of power, that is, electrical power required by the power receiving device, to a plurality of power supply devices. When the required quantity of power is received from the power receiving device, each power supply device prepares criteria information based on the received required quantity of power so that the power receiving device can use the information as criteria when selecting a power supply device, and transmits the prepared criteria information to the power receiving device. The power receiving device receives such criteria information from the plurality of power supply devices and selects a power supply device from which the power receiving device receives supply power, based on the criteria information, and transmits a power supply start request to the selected power supply device. When the power supply start request is received, the selected power supply device starts power supply to the power receiving device.

Deregulation of electrical power and progress of the wireless power transmission technology mentioned above are expected to accelerate diversification of the terminals of the power transmission sources and power receiving destinations. In the information and communication field, spread spectrum modulation is performed for multiple access of both transmission and reception terminals in order to eliminate interference with other users that would occur during demodulation on the receiving side. It is known, in particular, that use of constant-power chaotic spreading codes can ensure perfect orthogonality and good autocorrelation characteristics (e.g., see PTL 2).

Furthermore, orthogonal frequency division multiplex (OFDM) has been known as a multicarrier modulation system which, however, is likely to cause amplification saturation due to the large amplitude fluctuations or occurrence of large peaks in specific time periods because many different frequencies are synthesized. Therefore, it has been an important issue to reduce the ratio between a peak value and an average value (peak to average power ratio (PAPR)). In this regard, it is known that an ultra-frequency multiplexing method using an almost periodic frequency arrangement is effective from the perspective of signal processing (e.g., see NPTL 2).

It is known that high efficiency and high power are achieved when a large air gap is formed in a magnetic field resonance coupling method among contactless power supply methods, that is, a method using an LC resonator provided with a coil (L) and a capacitor (C) having matched resonance frequencies, for both the power supply device and the power receiving device (e.g., see NPTL 3).

CITATION LIST

Patent Literature

PTL 1: JP 5116904 B
PTL 2: JP 5131550 B

Non Patent Literature

NPTL 1: "Nikkei Business Online Nikkei Energy Next 'ENERES started power blockchain for MINDEN'" [Online], Mar. 19, 2018 [Searched Oct. 28, 2018], Internet <URL: https://business.nikkeibp.co.jp/atcl/report/16/022700115/031500093/>

NPTL 2: "Performance evaluation of satellite communication system using almost periodic frequency arrangement" by Isao NAKAZAWA and Ken UMENO, IEICE Technical Report, The Institute of Electronics, Information and Communication Engineers, pp 75-79, No. 115, November 2015

NPTL 3: "Unified Theory of Electromagnetic Induction and Magnetic Resonant Coupling" by Takehiro IMURA and Yoichi HORI, Journal of Industry Applications, IEEJ Transactions on Electrical and Electronic Engineering D, The Institute of Electrical Engineers of Japan, pp 697-710, No. 6, Vol. 135, June 2015

SUMMARY OF THE INVENTION

Technical Problem

However, the electrical power transaction platform mentioned above is a system for virtually confirming whether power consumption matches power generation. Therefore, the recorded data in the ledger and the supplied power are processed in different systems using different transmission lines. This raises an issue that there is no guarantee that they will both be associated with each other in real time, and that the system configuration becomes complicated.

Furthermore, according to the technique proposed by PTL 1, when power supply is requested to a plurality of power supply devices from a power receiving device, each power supply device calculates a distance from the current position of the power receiving device to the power supply device and also calculates a transmission efficiency of transmitting power to the power receiving device based on the calculated distance, and transmits the calculated transmission efficiency to the power receiving device. It is configured so that the power receiving device receives the transmission efficiency as criteria information, selects a power supply device presenting good transmission efficiency, and transmits a power supply start request to the selected power supply device, and then power supply is started by the selected power supply device. Thus, selection of a power supply device is in the range limited by the criteria information which is based on the transmission efficiency, and accordingly consumers cannot freely choose a desired power transmission source. Also, as in the case of the electrical power transaction platform, the power supply process and the transmission/reception processing of the criteria information are performed using different systems. Therefore, issues similar to the above arise.

Furthermore, as mentioned above and as in the information and communication field, diversification of the power receiving terminals may require a system in which the parties involved in power transactions (i.e., the power supply side and the power receiving side) can reliably and safely perform transactions.

The disclosure of the present specification is to eliminate the above issues and aims to provide a power supply device and a power supply system with which consumers can freely choose electrical power and specify power supply sources when receiving power, and with which the parties involved in transactions (the power supply side and the power receiving side) can reliably and safely perform transactions.

Solution to Problem

To achieve the aim set forth above, a power supply device according to the disclosure of the present specification has included a baseband unit that generates a power signal to supply electrical power to a power receiving device, a modulation processing unit that modulates the power signal generated by the baseband unit to impart a code thereto for specifying a transmission source of the power signal, and generates a modulated signal that can be demodulated by the power receiving device, and a transmission unit that transmits a modulated signal generated by the modulation processing unit.

According to this configuration, a power signal can be encoded and modulated in advance and can be transmitted to a power receiving device together with information for specifying a transmission source.

For the encoding processing, for example, a chaotic spreading code or an almost periodic function code can be used.

The modulation processing unit generates the modulated signal using the almost periodic function code that specifies a power signal of at least one transmission source, and the transmission unit allocates the modulated signal, in a predetermined frequency band, to a plurality of subcarriers different from each other, for transmission as a multicarrier signal.

Advantageous Effects of the Invention

The power supply device and the power supply system according to the disclosure of the present specification enable consumers to freely choose suppliers of electrical power and specify transmission sources when receiving electrical power. The present disclosure also has an advantageous effect of promoting the active use of renewable sources of electrical power and encouraging broad use of electrical power of contactless power supply.

DESCRIPTION OF THE EMBODIMENTS

Hereinafter, various embodiments for implementing the disclosure of the present specification will be described with reference to the drawings. Components of embodiments previously described that are included in embodiments subsequently described will be designated with the same reference signs to omit repeated description. If only a part of a configuration is described in each embodiment, other parts of the configuration may be designated with reference signs used in previously described embodiments. Even when possible specific combinations between embodiments are not explicitly shown, the embodiments can be partially combined unless the combinations pose any particular problems. The embodiments described below are only examples and the present disclosure is not limited to the following embodiments but can be variously modified unless the modifications depart from the gist of the disclosure of the present specification.

In general, information and communication field, data can be transmitted to only a specified terminal by encrypting the data even when high frequency media physically reach an unspecified number of receiving terminals. On the other hand, for example, in the case of contactless power transmission using a radio wave radiation method, the transmission is unmodulated narrow-spectrum continuous radiation that may cause interference. Thus, it has been difficult to transmit data to only a specified terminal as in the information and communication field mentioned above. In view of the above, the disclosure of the present specification has unprecedented features in which electrical power is encoded in advance using digital processing before being transmitted.

Figure 1:
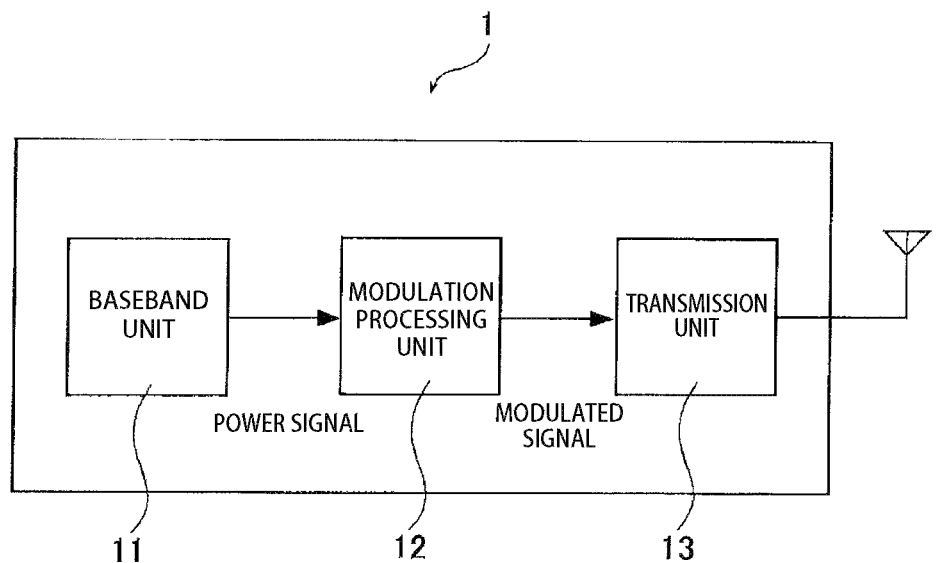
FIG. 1 is a set of diagrams in which (A) is a block diagram illustrating a power supply device and (B) is a block diagram illustrating a power receiving device configuring a power supply system according to the disclosure of the present specification.
Figure 1:
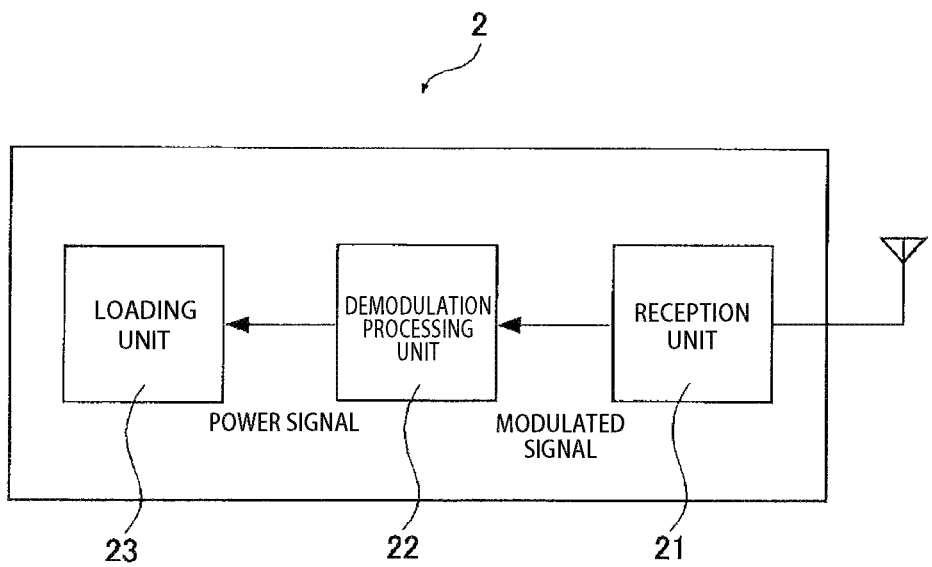

FIG. 1 is a set of block diagrams illustrating a power supply device and a power receiving device configuring a power supply system, according to the disclosure of the present specification. The block diagrams of FIG. 1 are schematic diagrams each illustrating a configuration including only required components, omitting general components required for power transmission/reception, in order to describe features of the disclosure of the present specification. As will be described later, the power supply device and the power receiving device may be provided not only as those configured as dedicated devices, but may also be provided as moving object terminals having power supply and power reception functions and other functions than these functions.

FIG. 1(A) is a block diagram illustrating a power supply device. A power supply device 1 includes a baseband unit 11, a modulation processing unit 12, and a transmission unit 13. The baseband unit 11 generates a baseband signal, i.e., a power signal, before being modulated. The modulation processing unit 12 modulates the power signal generated by the baseband unit 11 to impart a code thereto for specifying a transmission source of the power signal, and generates a modulated signal that can be demodulated by a power receiving device which will be described later. The transmission unit 13 transmits the modulated signal generated by the modulation processing unit 12.

FIG. 1(B) is a block diagram illustrating a power receiving device. A power receiving device 2 includes a reception unit 21, a demodulation processing unit 22, and a loading unit 23. The reception unit 21 receives a modulated signal generated by the power supply device 1 via a predetermined transmission line. The demodulation processing unit 22 demodulates the received modulated signal. The loading unit 23 receives the power signal obtained through the demodulation processing.

The transmission line between the power supply device 1 and the power receiving device 2 may not only be a contactless (wireless) transmission line but may also be a transmission line via a power line that uses power line communication (PLC) or broadband over power line (BPL) communication. In the case of the wireless transmission line as well, the power transmission method is not particularly limited. Specifically, the transmission line may be formed via any power line based on non-radiative magnetic field coupling (electromagnetic induction or magnetic field resonance), electric field coupling, evanescent waves, or radiated radio waves (microwaves, etc.), lasers, or the like.

<Power Supply Device>

First Embodiment

Figure 2:
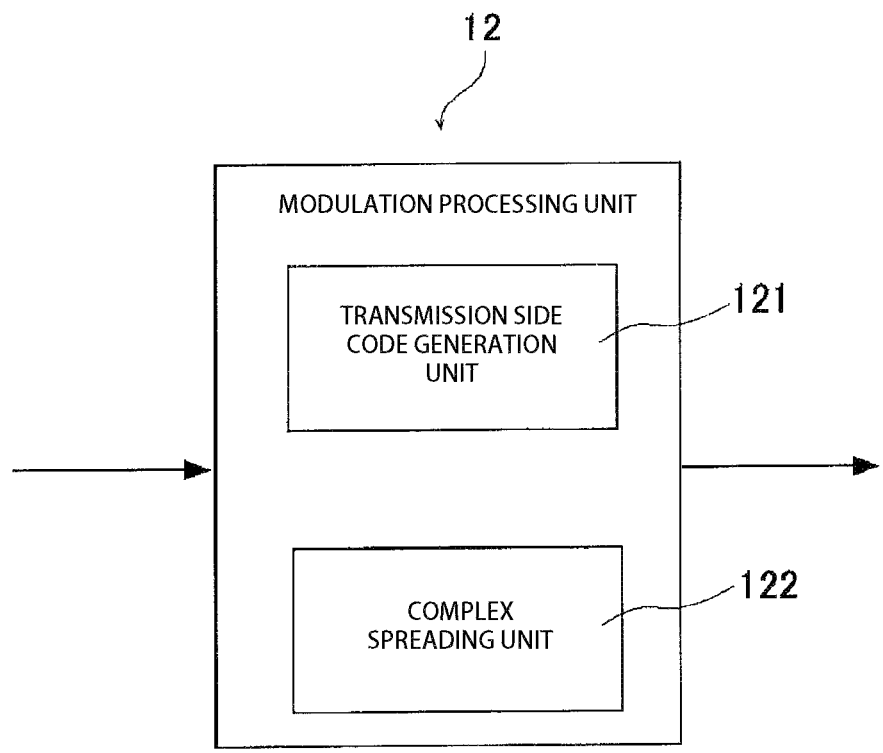
FIG. 2 is a set of diagrams illustrating a modulation processing unit and a demodulation processing unit of a power supply device and a power receiving device using spread spectrum modulation, in which (A) is a block diagram illustrating a modulation processing unit of a power supply device and (B) is a block diagram illustrating a demodulation processing unit of a power receiving device.
Figure 2:
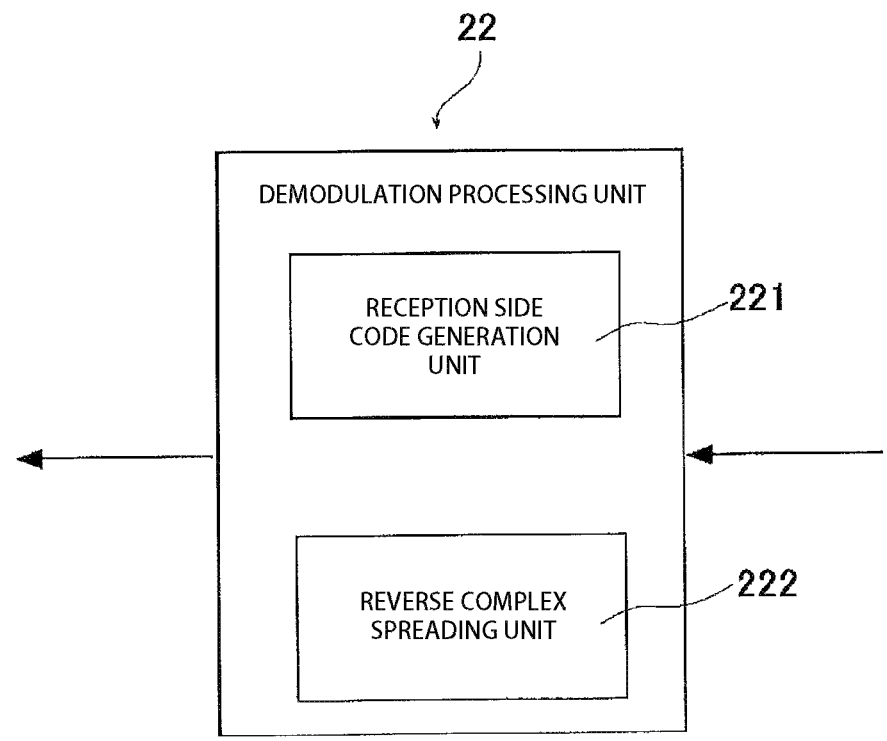

FIG. 2 is a set of diagrams illustrating the modulation processing unit 12 and the demodulation processing unit 22 of the power supply device and the power receiving device performing spread spectrum modulation. Specifically, a spreading code is imparted to a power signal through the spread spectrum modulation for multiplication with the power signal to thereby generate a modulated signal. As shown in FIG. 2(A), the modulation processing unit 12 includes a transmission side code generation unit 121 that generates a spreading code using a high speed code sequence, and a complex spreading unit 122 that performs complex spreading for the spreading code using two code sequences. As shown in FIG. 2(B), the demodulation processing unit 22 includes a reception side code generation unit 221 that generates a spreading code as in the transmission side code generation unit 121, and a complex despreading unit 222 that despreads the modulated signal transmitted from the transmission unit 13 of the power supply device 1 and received by the reception unit 21 shown in FIG. 1(B).

In the first embodiment, a mode using a constant-power chaotic spreading code as the spreading code will be described. The constant-power chaotic spreading code has a high SN ratio for received signals, significantly increases the amount of information carried on radio waves more than any other spreading codes, and has high fading resistance, and accordingly, is also suitable for transmitting the power signal.

In general, the number of primitive roots q of a prime number p is given by $\phi(p-1)$ using Euler's totient function $\phi(\cdot)$. Accordingly, the transmission side code generation unit 121 receives any of $\phi(p-1)$ primitive roots $q_1, q_2, \ldots, q_{\phi(p-1)}$ corresponding to a prime number p as a primitive root q for generating a spreading code, and at the same time receives any of integers $0, 1, 2, \ldots, p-1$ as a number k for generating a spreading code, apart from reception of the primitive root q.

Next, using a predetermined angle $\theta$ and based on the received primitive root q and the received number k, the transmission side code generation unit 121 generates a complex spreading code of length p, as $b(q, k)=(\exp(i\theta), \exp(2\pi i \times q^{0+k}/p), \exp(2\pi i \times q^{1+k}/p), \exp(2\pi i \times q^{2+k}/p), \ldots, \exp(2\pi i \times q^{(p-2)+k}/p))$, where $k=0, 1, 2, \ldots, p-2$.

On the other hand, the transmission side code generation unit 121 generates a complex spreading code of length p, as $b(q, k)=(\exp(i\theta), 1, 1, \ldots, 1)$, where $k=p-1$.

Specifically, the transmission side code generation unit 121 generates one complex spreading code $b(q, k)$ using the primitive root q as a primitive root for generating a chaotic spreading code and using the integer k as an identification number for generating a chaotic spreading code.

Next, the complex spreading unit 122 spreads one power signal to be transmitted using the complex spreading code $b(q, k)$ generated for the integer k.

The reception side code generation unit 221 of the demodulation processing unit 22 also generates a complex spreading code using the primitive root q as a primitive root for generating a spreading code and using the integer k as an identification number for generating a spreading code. Specifically, since the power supply device 1 and the power receiving device 2 share the primitive root q and the identification number k, they share a complex spreading code $b(q, k)$ of length p.

When the reception unit 21 of the power receiving unit 2 described referring to FIG. 1 receives a power signal transmitted from the power supply device 1, the complex despreading unit 222 of the demodulation processing unit 22 despreads the power signal using the spreading code $b(q, k)$ generated for the integer k to obtain the power signal.

As described above, in the present embodiment, the power supply device 1 and the power receiving device 2 share a primitive root q among 4 (p-1) primitive roots $q_1, q_2, \ldots, q_{\phi(p-1)}$, any integer k among integers $0, 1, 2, \ldots, p-1$, and a predetermined angle $\theta$ (typically, $\theta=0$). The complex spreading code $b(q, k)$ is a code having perfect orthogonality and good autocorrelation characteristics.

Second Embodiment

In the second embodiment, a mode using an almost periodic function code as the spreading code will be described.

In the present embodiment, a parameter for determining each of K almost periodic function codes is expressed by $\delta+(k-1)/K$, where k is an integer from 1 to K and is an identifier for identifying each of the K almost periodic function codes. Of the K almost periodic function codes, a number of codes corresponding to the number of users or the number of channels are used for modulation.

It is preferred that K is N or 2N (N is the length of an almost periodic function code) and δ is a real number that is greater than 0 and less than 1/N.

As shown in FIG. 1(A), the power supply device 1 that uses the almost periodic function code in the spread spectrum modulation includes the modulation processing unit 12 that modulates a power signal. The modulation processing unit 12 applies an almost periodic function code to a power signal to output a modulated signal. The modulated signal (transmission data) transmitted from the transmission unit 13 may be one to which primary modulation, such as BPSK, QPSK or 16QAM, has been applied. The modulated signal outputted from the modulation processing unit 12 is received by the power receiving device 2 via a transmission line, and demodulated by the demodulation processing unit 22, so that electrical power is supplied from the loading unit 23.

Third Embodiment

The third embodiment describes multicarrier transmission, that is, a mode in which a multicarrier frequency arrangement is an almost periodic frequency arrangement in which subcarriers are asynchronous therebetween and frequency intervals are uneven. The almost periodic frequency arrangement refers to a frequency arrangement in which subcarriers are asynchronous therebetween with respect to a frame duration as a delimiter of a signal string, with uneven intervals therebetween. The almost periodic frequency refers to the frequency of each subcarrier on the almost periodic frequency arrangement.

In general, in orthogonal frequency division multiplexing (OFDM) that is a multicarrier modulation method, reducing a peak to average power ratio (PARR), which is a ratio of peak value to average value, is an important issue. Since the present embodiment uses an almost periodic frequency arrangement in which subcarriers are asynchronous therebetween with respect to a frame duration, increase of PAPR can be prevented even when the number of multiplexed carriers increases.

Figure 3:
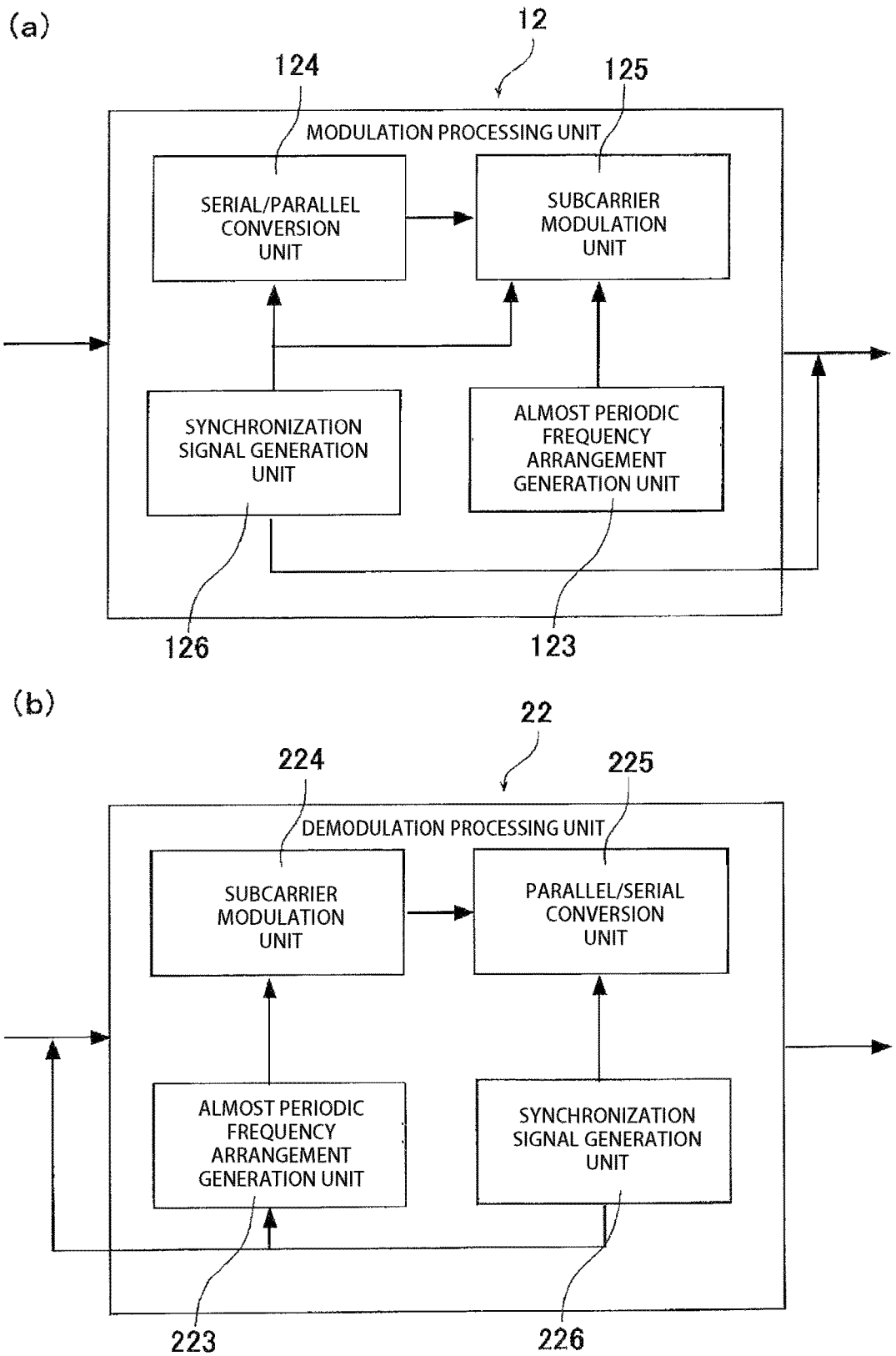
FIG. 3 is a set of diagrams illustrating a modulation processing unit and demodulation processing unit of a power supply device and a power receiving device each using a multicarrier frequency arrangement that is an almost periodic frequency arrangement in which subcarriers are asynchronous therebetween and frequency intervals are uneven, in which (A) is a block diagram illustrating a modulation processing unit of a power supply device and (B) is a block diagram illustrating a demodulation processing unit of a power receiving device.

FIG. 3 is a set of diagrams illustrating a modulation processing unit 12 and a demodulation processing unit 22 of a power supply device and a power receiving device in which the multicarrier frequency arrangement is an almost periodic frequency arrangement.

In response to reception of a power signal from the baseband unit 11 shown in FIG. 1(A), the modulation processing unit 12 causes a serial/parallel conversion unit 124 to convert the power signal (serial code) to a parallel code having a parallel number corresponding to multiplex code length N. The parallel code with code length N becomes a transmission code. A subcarrier modulation unit 125 performs almost periodic frequency multiplex modulation using Formula 1.

Transmission code: $(d_1 d_2 d_3 \ldots d_{N-1} d_N)$ [Math. 1]

Code string transmitted from transmission system: $(y_1 y_2 y_3 \ldots y_{N-1} y_N)$ Input/output relational expression $$\begin{pmatrix} y_1 \\ y_2 \\ \vdots \\ y_N \end{pmatrix} = \begin{pmatrix} a_1 & a_2 & \cdots & a_{N-1} & a_N \\ b_1 & b_2 & \cdots & b_{N-1} & b_N \\ \vdots & \vdots & \cdots & \vdots & \vdots \\ p_1 & p_2 & \cdots & p_{N-1} & p_N \end{pmatrix} \begin{pmatrix} d_1 \\ d_2 \\ \vdots \\ d_N \end{pmatrix}$$

An almost periodic frequency expression on the frequency axis is incorporated herein as follows.

$$a_k = A_k e^{I\sqrt[n]{P_{dk} t + I\theta_k}} \quad (0 \le t < T)$$
$$b_k = B_k e^{I\sqrt[n]{P_{dk} t + I\theta_k}} \quad (T \le t < 2T)$$
$$\vdots$$

where,
$A_k$, $B_k$: Amplitude of $k^{th}$ subcarrier in almost periodic frequency
$Pd_k$: $k^{th}$ prime value in almost periodic frequency
n: $n^{th}$ root
I=Imaginary unit
T: Duration of signal processing The subcarrier modulation unit 125 performs subcarrier modulation for the transmission code $(d_1 d_2 d_3 \ldots d_{N-1} d_N)$ having code length N to output a multicarrier signal with an almost periodic frequency arrangement indicated by a code string $(y_1 y_2 y_3 \ldots y_{N-1} y_N)$. The subcarrier modulation unit 125 performs multicarrier modulation, based on a multicarrier signal supplied by an almost periodic frequency arrangement generation unit 123.

The almost periodic frequency arrangement generation unit 123 may be one that includes, for example, a prime number group storage unit, an almost periodic frequency group calculation/storage unit, a reference frequency arrangement calculation/storage unit, and an almost periodic frequency arrangement search/storage unit, which are not shown. The prime number group storage unit stores a great number (e.g., 10 million) of prime numbers used for calculating an almost periodic frequency. The almost periodic frequency group calculation/storage unit calculates an almost periodic frequency for storage therein, using the prime numbers stored in the prime number group storage unit. The reference frequency arrangement calculation/storage unit calculates a reference frequency arrangement for storage therein, for use in determining the almost periodic frequency arrangement. The almost periodic frequency arrangement search/storage unit searches and selects an almost periodic frequency approximate to the reference carrier frequency in the reference frequency arrangement from the almost periodic frequency groups, determines an almost periodic frequency arrangement, and stores the determined almost periodic frequency arrangement.

In the input/output relational expression shown in Formula 1, the matrix having elements $a_k b_k \ldots p_k$ ($1 \le k \le N$) is an N×N matrix. Also, in Formula 1, $p_{dk}$ is a prime number used for generating a $k^{th}$ frequency in an almost periodic frequency arrangement having N carriers. Furthermore, in Formula 1, $\theta_k$ is an arbitrary real number and may be 0.

In the input/output relational expression shown in Formula 1, the definition of elements $c_k \ldots p_k$ other than the elements $a_k b_k$ is not explicitly indicated; however, $A_k$, $B_k$ included in the definition of the elements $a_k b_k$ may be replaced with $C_k \ldots P_k$. $C_k \ldots P_k$ are each an amplitude of a $k^{th}$ carrier, similarly to $A_k$, $B_k$.

Subcarrier signals outputted from the subcarrier modulation unit 125 are provided to the transmission unit 13 shown in FIG. 1(A) and transmitted to the power receiving device 2 as an almost periodic subcarrier output signal (almost periodic frequency subcarrier synthesized signal). The serial/parallel conversion unit 124, the subcarrier modulation unit 125, and the transmission unit 13 operate according to a synchronization signal provided from a synchronization signal generation unit 126.

The demodulation processing unit 22 includes a subcarrier demodulation unit 224, an almost periodic frequency arrangement generation unit 223, a parallel/serial conversion unit 225, and a synchronization signal generation unit 226.

The reception unit 21 shown in FIG. 1(B) receives input of the received modulated signal (almost periodic frequency subcarrier synthesized signal) and provides it to the subcarrier demodulation unit 224. The subcarrier demodulation unit 224 performs demodulation by calculating a cross-correlation value (complex cross-correlation value) between the almost periodic frequency (almost periodic frequency arrangement for demodulation; almost periodic complex carrier waves) of the received modulated signal used on the transmission side, and the received modulated signal. The frequency of the almost periodic frequency arrangement for demodulation is provided from the almost periodic frequency arrangement generation unit 223. For calculation of a cross-correlation value of a signal, for example, a method of Formula 2 in which the value is calculated on a time axis, or a method of Formula 3 in which the value is calculated from a cross spectrum may be used.

$$S_2 = r_2 e^{j\theta_2} \quad \text{[Math. 2]}$$

$$\rho(S_1, S_2^*) = \frac{\frac{1}{T}\int_0^T (S_1, S_2^*)dt}{\frac{1}{T}\sqrt{\int_0^T (S_1, S_1^*)dt \times \int_0^T (S_2, S_2^*)dt}}$$

$$W_{xy}(\Delta f) = \frac{\sum_{n=0}^{N-1} X^*(f_n)Y(f_n)}{N} \quad \text{[Math. 3]}$$

The signal outputted from the subcarrier demodulation unit 224 is converted to serial data by the parallel/serial conversion unit 225. The serial data is outputted to the loading unit 23 shown in FIG. 1(B) as a demodulated power signal, and electrical power is supplied therefrom.

The reception unit 21 shown in FIG. 1(B), the subcarrier demodulation unit 224, the almost periodic frequency arrangement generation unit 223, and the parallel/serial conversion unit 225 operate according to a synchronization signal provided from the synchronization signal generation unit 226.

Fourth Embodiment

Figure 4:
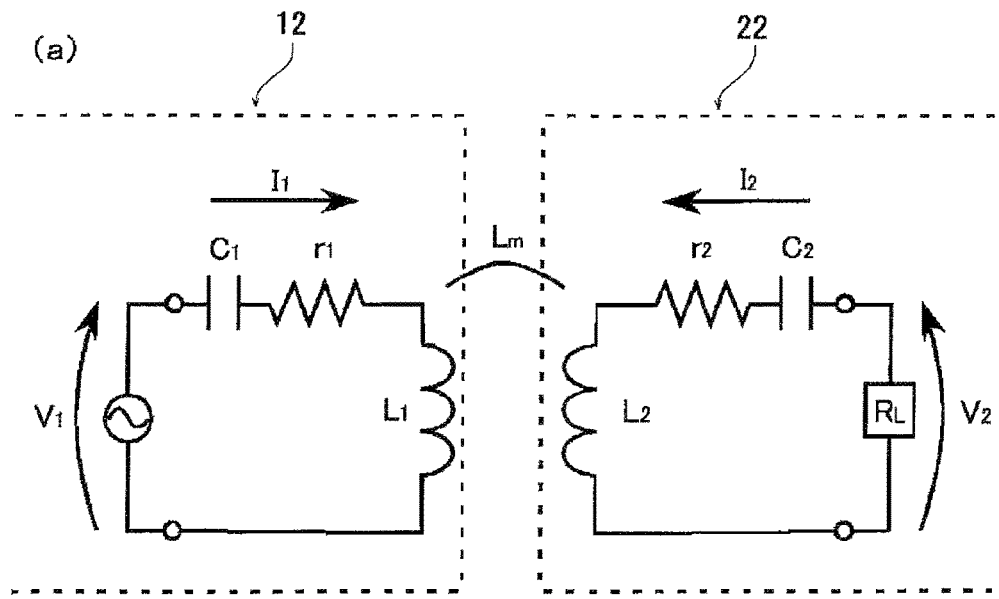
FIG. 4 is a set of diagrams illustrating the case in which an almost periodic frequency is transmitted as a magnetic field resonance type resonance frequency using a multicarrier signal corresponding to a power signal, in which (A) is a basic circuit configuration diagram and (B) is an equivalent circuit diagram of the basic configuration circuit.
Figure 4:
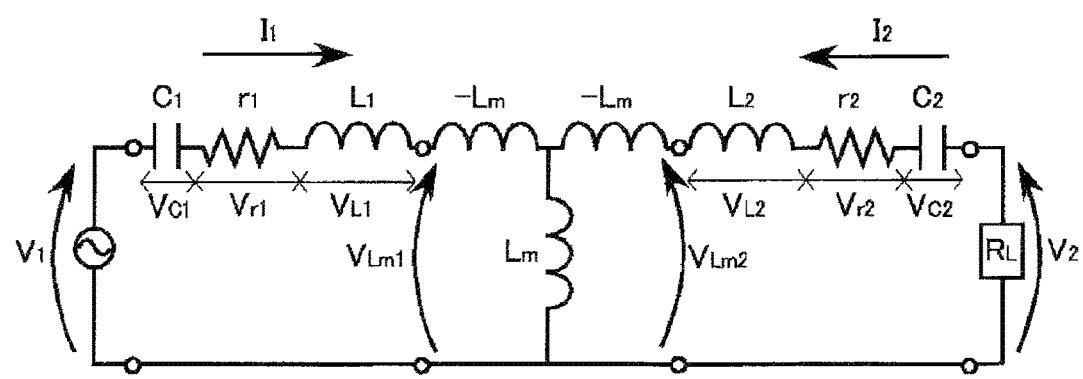

FIG. 4(A) is a diagram illustrating a basic circuit configuration in which an almost periodic frequency is transmitted as a magnetic field resonance coupling type (magnetic field resonance type) resonance frequency, using the multicarrier signal corresponding to a power signal, described referring to FIG. 3. Specifically, as shown by this circuit diagram of a primary series secondary series capacitor system (SS system), the modulation processing unit 12 of the power supply device 1 has a primary side circuit and the demodulation processing unit 22 of the power receiving device 2 has a secondary side circuit. Modulation (of signals with different frequencies corresponding to respective transmission sources) by an almost periodic frequency arrangement can be realized by matching the frequencies to the magnetic field resonance type resonance frequency. Accordingly, a power signal can be transmitted through a known basic circuit. As shown in FIG. 4(A), the primary side circuit and the secondary side circuit both have a configuration of an RLC series circuit. In this configuration, $C_1$ is a resonance capacitance of the primary side circuit, $r_1$ is a line resistance of the primary side circuit, $L_1$ is a coil reactance of the primary side circuit, $C_2$ is a resonance capacitance of the secondary side circuit, $r_2$ is a line resistance of the secondary side circuit, $L_2$ is a coil reactance of the secondary side circuit, $R_L$ is a load of the secondary side circuit, and $L_m$ is a mutual inductance between the $L_1$ and $L_2$.

FIG. 4(B) is an equivalent circuit diagram of the basic circuit configuration diagram. In general, in an equivalent circuit, a leakage inductance, as $-L_m$, is illustrated as being included within $L_m$; however, in FIG. 4(B), $-L_m$ is explicitly illustrated. The voltage of the primary side circuit and the voltage of the secondary side circuit are respectively expressed by Formulas 4 and 5 which may be modulated as Formulas 6 and 7. In these formulas, $V_1$ is a primary circuit side (source side) voltage, $V_2$ is a secondary circuit side (load $R_L$ side) voltage, $V_{C1}$ is a voltage applied to the resonance capacitance $C_1$ of the primary side circuit, $V_{L1}$ is a voltage applied to the coil reactance $L_1$ of the primary side circuit, $V_{r1}$ is a voltage applied to the line resistance $r_1$ of the primary side circuit, $V_{C2}$ is a voltage applied to the resonance capacitance $C_2$ of the secondary side circuit, $V_{L2}$ is a voltage applied to the coil reactance $L_2$ of the secondary side circuit, $V_{r2}$ is a voltage applied to the line resistance $r_2$ of the secondary side circuit, $V_{Lm1}$ is an output voltage of the primary side circuit, and $V_{Lm2}$ is an input voltage of the secondary side circuit.

$$V_1 = V_{L1} + V_{C1} + V_{r1} + V_{Lm1} \quad \text{[Math. 4]}$$

$$0 = V_{L2} + V_{C2} + V_{r2} + V_2 + V_{Lm2} \quad \text{[Math. 5]}$$

$$V_1 = j\omega L_1 I_1 + \frac{1}{j\omega C_1}I_1 + I_1 r_1 + j\omega L_m I_2 \quad \text{[Math. 6]}$$

$$0 = j\omega L_2 I_2 + \frac{1}{j\omega C_3}I_2 + I_2 r_2 - I_2 R_L + j\omega L_m I_1 \quad \text{[Math. 7]}$$

The resonance condition of the secondary side circuit is expressed by Formula 8, and the resonance frequency of the primary side circuit is expressed by Formula 9.

$$V_{L2} + V_{C2} = \left[j\omega L_2 + \frac{1}{j\omega C_2}\right]I_2 = 0 \quad \text{[Math. 8]}$$

$$V_{L1} + V_{C1} = \left[j\omega L_1 + \frac{1}{j\omega C_1}\right]I_1 = 0 \quad \text{[Eq. 9]}$$

When the resonance frequencies of the primary side circuit and the secondary side circuit match, the resonance frequency is as shown in Formula 10.

$$\omega_0 = \omega_1 = \sqrt{\frac{1}{L_1 C_1}} = \omega_2 = \sqrt{\frac{1}{L_2 C_2}} \quad \text{[Math. 10]}$$

If Formula 10 is satisfied, a predetermined power signal having an almost periodic frequency transmitted from the power supply device 1 having a primary side circuit can be received only by the power receiving device 2 having a secondary side circuit which resonates with the power signal having the almost periodic frequency.

Figure 5:
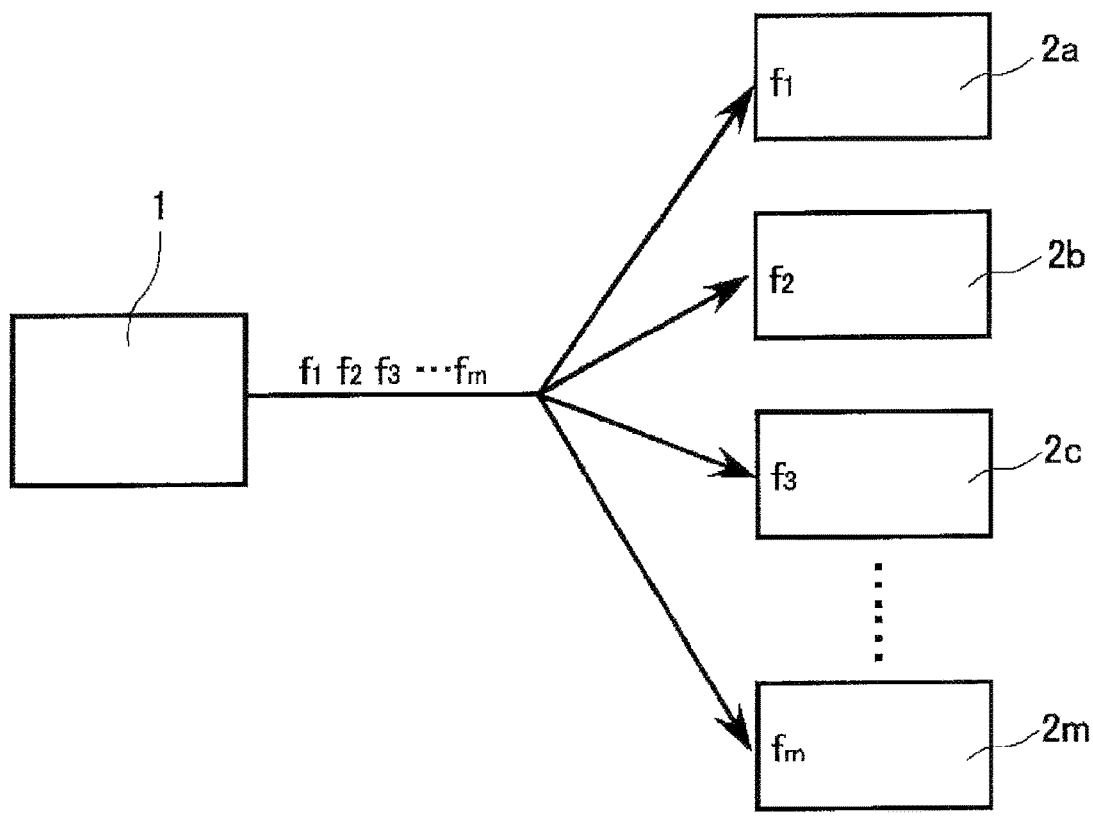
FIG. 5 is a diagram illustrating a power supply device which transmits a plurality of almost periodic frequencies, and a plurality of power receiving devices which include resonance circuits matching the respective almost periodic frequencies.

FIG. 5 is a diagram illustrating a state in which power signals having a plurality of almost periodic frequencies ($f_1$, $f_2$, $f_3$ ... $f_m$) are transmitted from the power supply device 1 and received by a plurality of receiving devices 2a, 2b, 2c and 2m having respective resonance circuits matching the almost periodic frequencies. Even when the power supply device 1 transmits power signals having a plurality of almost periodic frequencies ($f_1$, $f_2$, $f_3$ ... $f_m$) after modulating them with an almost periodic frequency arrangement, the power receiving devices 2a, 2b, 2c and 2m, which are provided in advance with respective secondary side circuits (resonance circuits) resonating only with specific almost predetermined frequencies among the power signals, can allow the respective demodulation processing units to receive only the power signals having the specific almost periodic frequencies (in FIG. 4, the receiving device 2a receives $f_1$, the receiving device 2b receives $f_2$, the receiving device 2c receives $f_3$, and the receiving device 2m receives $f_m$).

As described above, the magnetic field resonance type resonance frequency also enables discrimination and selective reception of only a desired power signal on the power receiving device 2 side.

<Power Supply System>

Referring now to FIGS. 6 to 32, configurations of the power supply system disclosed by the present specification will be described.

First Embodiment

Figure 6:
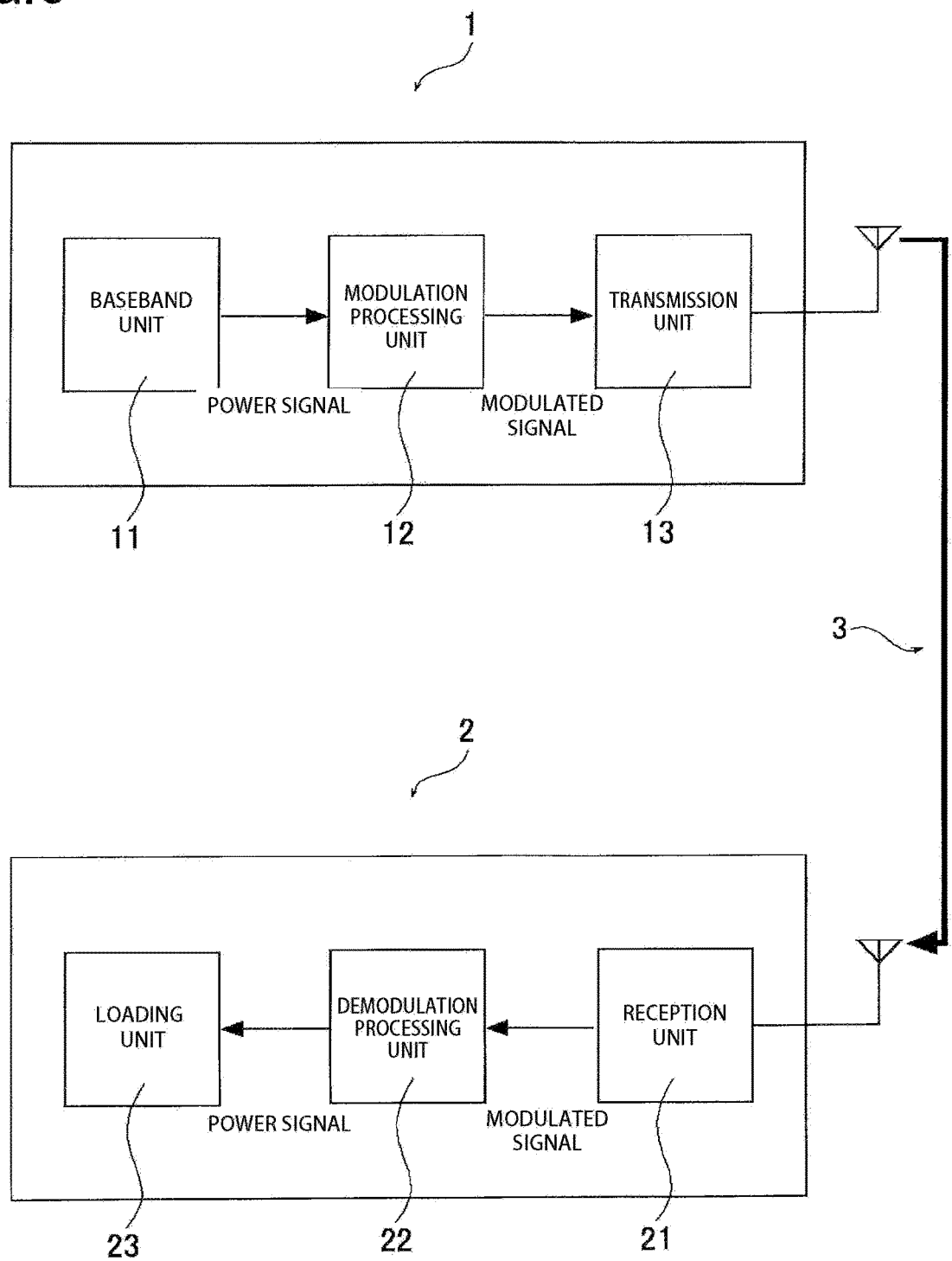
FIG. 6 is a block diagram illustrating a power supply system according to a first embodiment.
Figure 7:
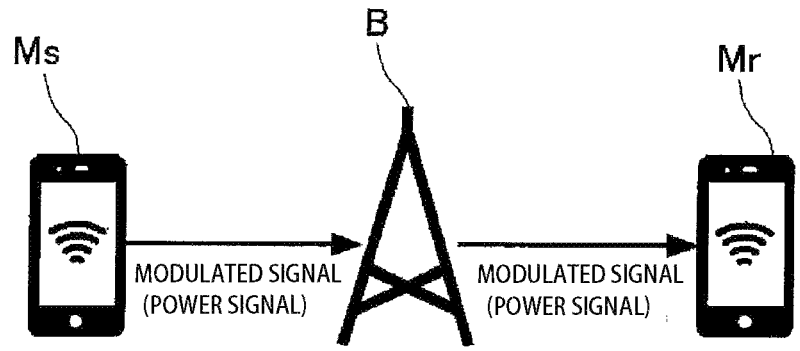
FIG. 7 is a set of diagrams illustrating specific examples of the first embodiment, in which (A) is a schematic diagram illustrating a state of power supply using smartphones including a power supply device and a power receiving device, (B) is a schematic diagram illustrating a state of power supply using vehicles including a power supply device and a power receiving device and (C) is a schematic diagram illustrating a state of power supply using an unmanned aerial vehicle (drone) including a power supply device and a power receiving device.
Figure 7:
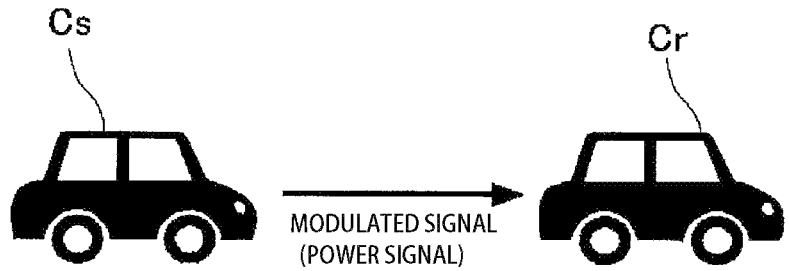
Figure 7:
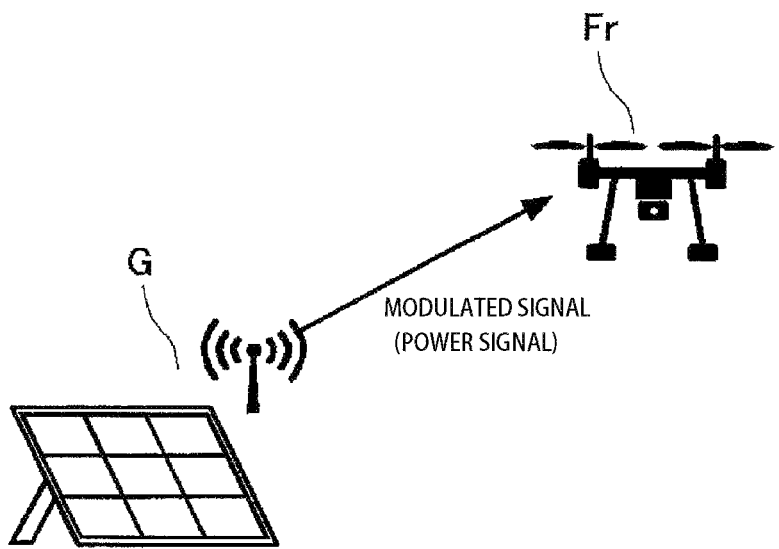

FIG. 6 shows a basic configuration of the power supply system. The power supply system is provided with a transmission line 3 between the power supply device 1 shown in FIG. 1(A) and the power receiving device 2 shown in FIG. 1(B) to transmit power signals from the former to the latter. The present embodiment describes a power supply system using wireless transmission, and therefore the transmission line 3 indicates a frequency band.

The power supply system disclosed by the present specification will be described taking an example in which the power supply device 1 and the power receiving device 2 are moving objects. FIG. 7(A) shows an example in which the moving objects are smartphones. Specifically, in the example, a modulated signal, i.e., a power signal, is transmitted from a power supply smartphone Ms to a power receiving smartphone Mr via a power supply base station B. It should be noted that as a modification of the present embodiment (not shown), a smartphone Ms connected to an information and communication base station on an information and communication network may transmit power supply instruction data to a distant smartphone Mr via this information and communication base station, and the smartphone Mr may cause a power supply base station B, which is located in a range where the smartphone Mr can receive electrical power, to supply electrical power based on the power supply instruction data. In this case, the power supply base station B is also connected to the information and communication network so that the power supply instruction data can be received. Alternatively, a plurality of power supply base stations B may be connected to the information and communication network so that all of the base stations B can receive the power supply instruction data, and electrical power may be supplied to a smartphone Mr as a power receiving target from an optimum power supply base station B (usually, a power supply base station B located nearest the smartphone Mr). FIG. 7(B) shows an example in which the moving objects are vehicles. Specifically, in the example, a power signal is transmitted from a moving power supply vehicle Cs to a power receiving vehicle Cr moving in the same direction. FIG. 7(C) shows an example in which the moving object is an unmanned aerial vehicle (drone). Specifically, in the example, a power signal is transmitted from a power generator G to a drone Fr. In the case where electrical power is supplied to a moving object, there is a high risk of crosstalk occurring, i.e., power hacking by so-called spoofing, or other risks. However, as shown in the present examples, power supply based on a power signal according to the disclosure of the present specification has fading resistance due to use of a chaotic spreading code and ensures high security so that precise power supply can be performed.

Figure 8:
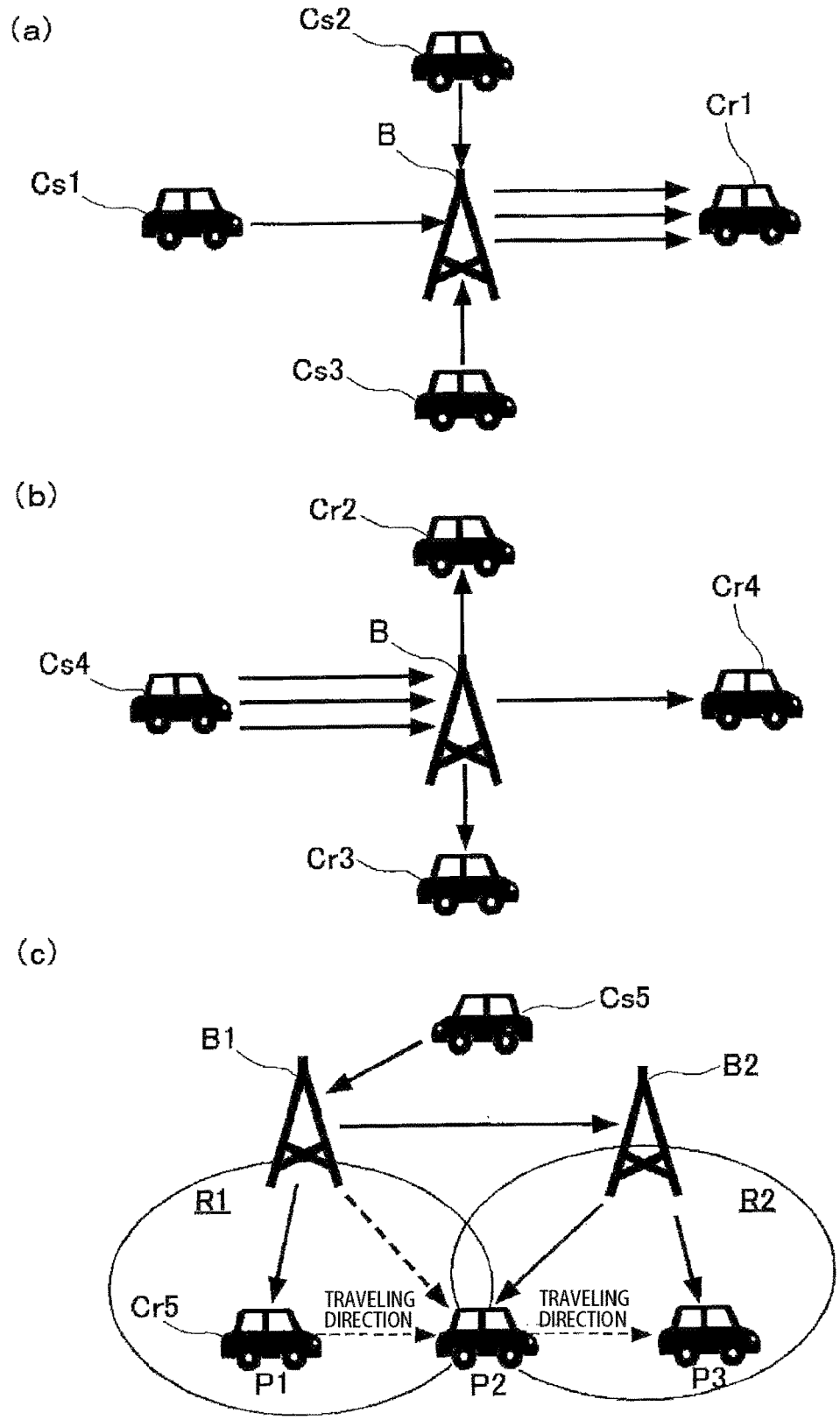
FIG. 8 is a set of schematic diagrams each illustrating a state of power supply in the case where the power supply device and the power receiving device according to the first embodiment are vehicles, in which (A) illustrates the case where there are multiple moving objects on the power supply side and there is a single moving object on the power receiving side, (B) illustrates the case where there is a single moving object on the power supply side and there are multiple moving objects on the power receiving side and (C) illustrates the case where the power receiving side moving objects continuously move to an adjacent cell.

As shown in FIG. 8, electrical power can be supplied to moving objects using various power supply patterns. The following description will be given using an example in which the moving objects are vehicles. FIG. 8(A) shows power supply from power supply vehicles Cs1, Sc2 and Cs3 (three vehicles) to a power receiving vehicle Cr1 via a power supply base station B. Specifically, electrical power can be supplied to a single power receiving vehicle from a plurality of power supply vehicles. In this case, a "multiple-to-one" power supply relationship is established.

FIG. 8(B) shows power supply from a power supply vehicle Cs4 (one vehicle) to power receiving vehicles Cr2, Cr3 and Cr4 (three vehicles) via a power supply base station B. Specifically, electrical power can be supplied to a plurality of power receiving vehicles from a single power supply vehicle. In this case, a "one-to-multiple" power supply relationship is established.

Furthermore, a "multiple-to-multiple" relationship, although it is not shown, including both the "multiple-to-one" and "one-to-multiple" relationships may be established. The disclosure of the present specification enables conversion of electrical power to be supplied into a signal for transmission of the converted signal together with an information signal, and thus achieves an unprecedented advantageous effect of simultaneously supplying electrical power from a plurality of moving vehicles (moving objects) to a plurality of moving vehicles (moving objects).

FIG. 8(C) is a schematic diagram illustrating the case where a power supply vehicle Cs5 supplies electrical power to a moving power receiving vehicle Cr5 via a power supply base station B1. At the start of power supply from the power supply vehicle Cs5 to the power receiving vehicle Cr5, the vehicle Cr5 travels in a cell R1 of the power supply base station B1. However, when the vehicle Cr5 moves into a cell R2 of a power supply base station B2 during power supply, the modulated signal is transferred from the power supply base station B1 to the power supply base station B2 by so-called soft handover, and power supply to the power receiving vehicle Cr5 is continuously performed. Continuous power supply is also performed by soft handover in the case where the power supply vehicle Cs5 supplies electrical power to the power receiving vehicle Cr5 while moving from the cell R1 into the cell R2 during the power supply, although this is not shown.

Second Embodiment

Figure 9:
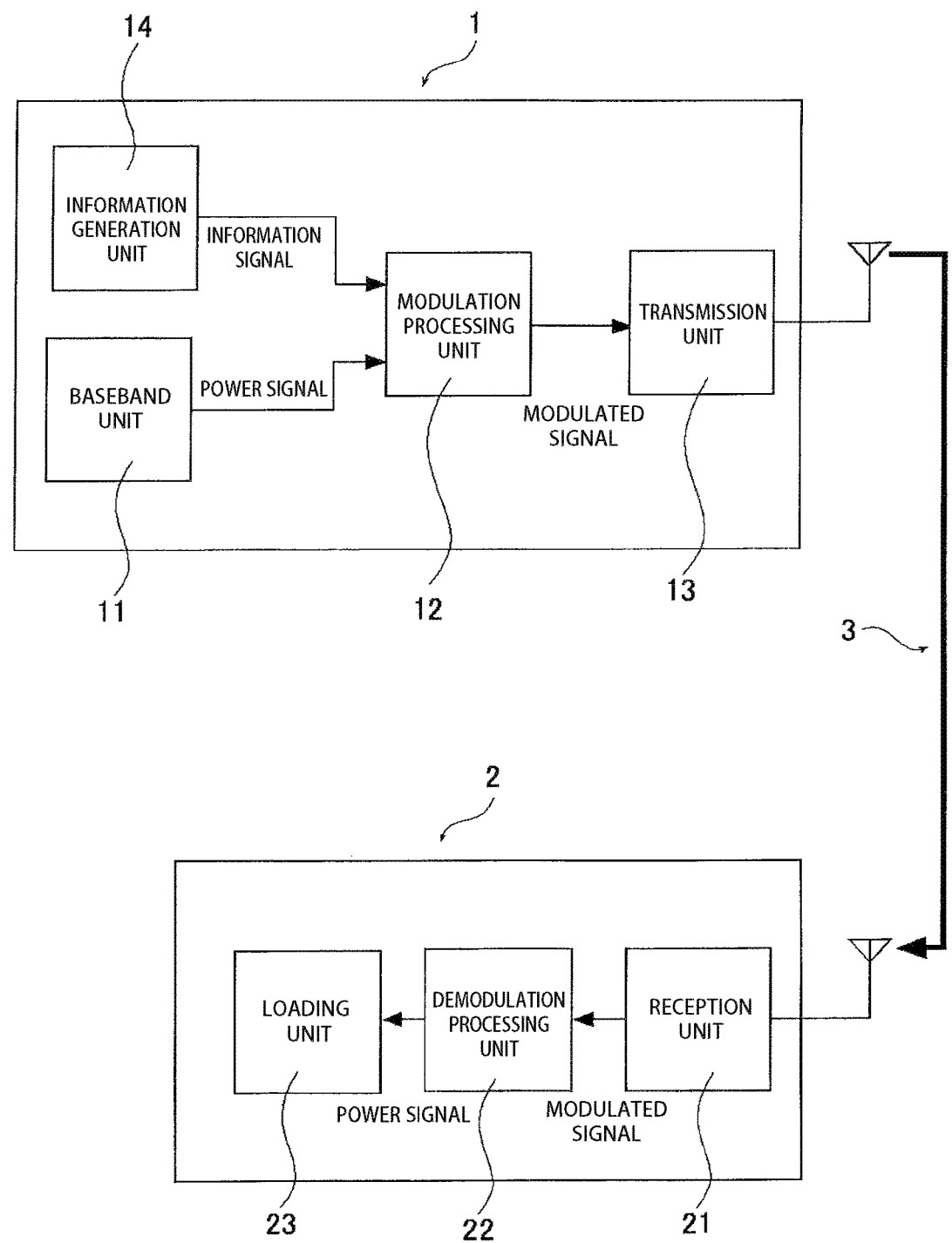
FIG. 9 is a block diagram illustrating a power supply system according to a second embodiment.

FIG. 9 is a block diagram illustrating a second embodiment of the power supply system. The power supply device 1 includes an information generation unit 14 that generates an information signal related to the power signal. An information signal generated by the information generation unit 14 is multiplexed with a power signal generated by the baseband unit 11, and generated as a modulated signal by the modulation processing unit 12.

Figure 10:
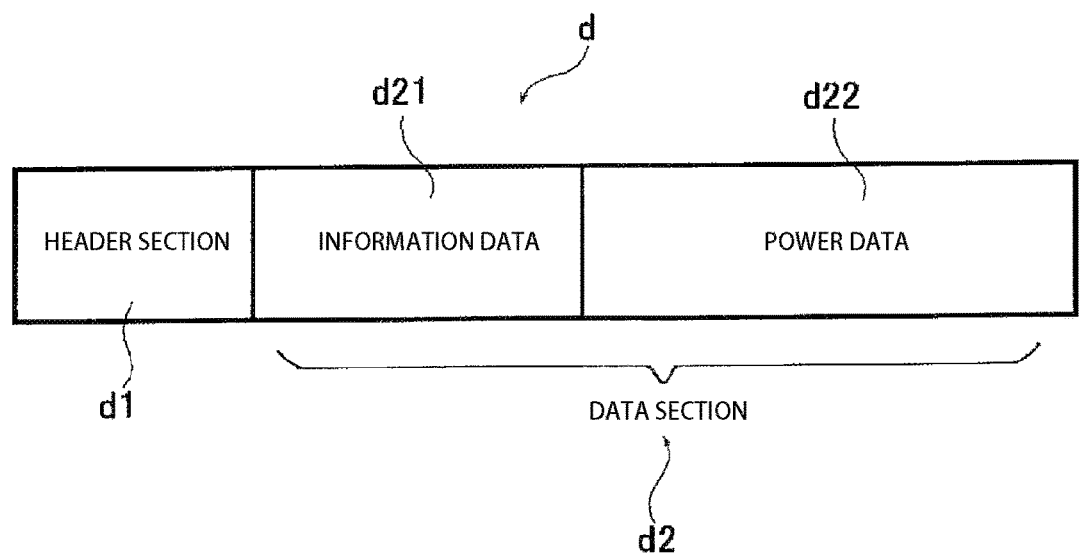
FIG. 10 is a schematic diagram illustrating communication data transmitted to a power receiving device according to the second embodiment.

Communication data d of the modulated signal that is generated from the power signal and the information signal has a structure shown in FIG. 10. Specifically, the communication data d is formed of a fixed-length header section d1 which includes transmission source information, transmission destination information, length information, and the like, and a data section d2 which includes information data d21 and power data d22.

Third Embodiment

Figure 11:
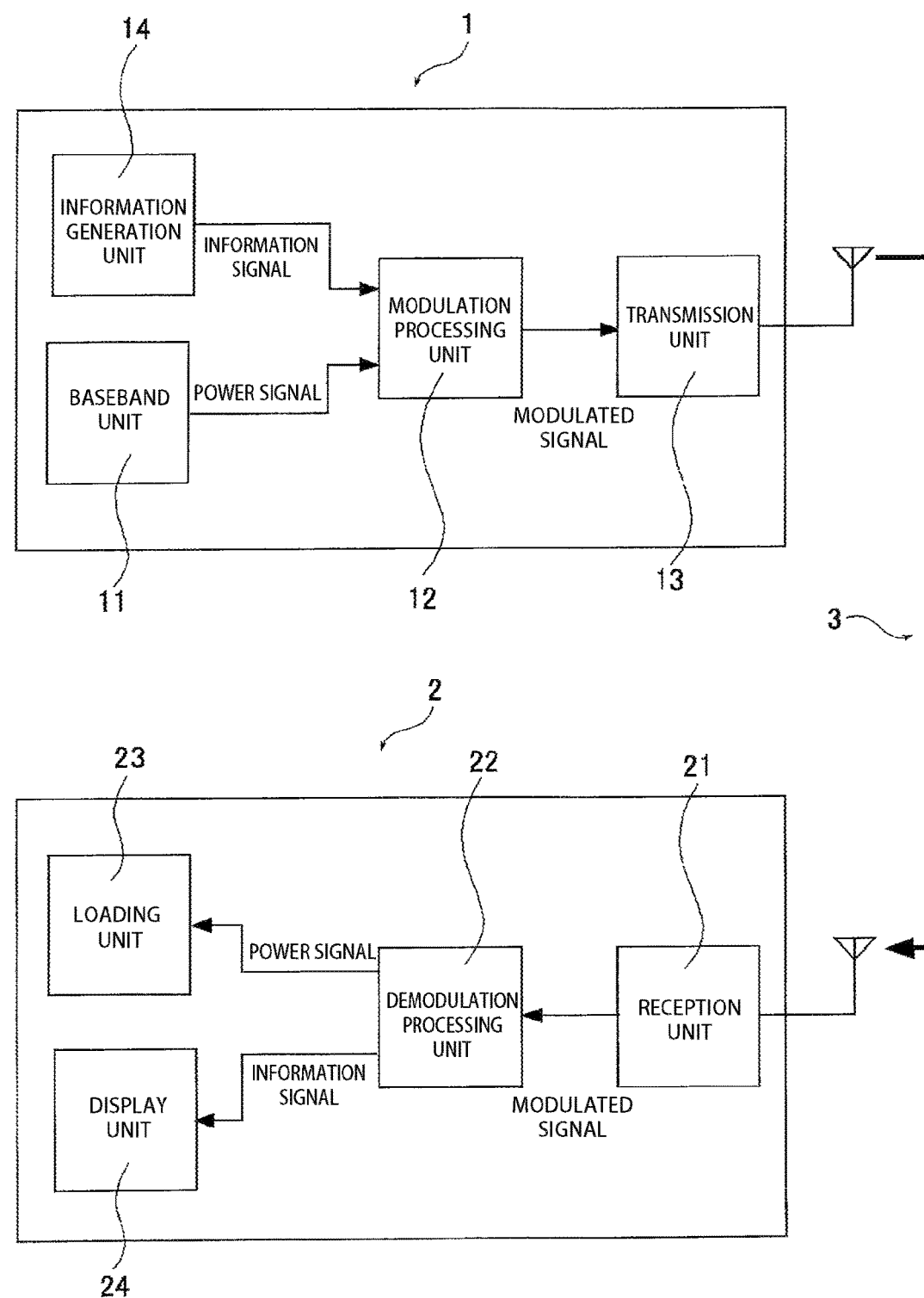
FIG. 11 is a block diagram illustrating a power supply system according to a third embodiment.

FIG. 11 is a block diagram illustrating a third embodiment of the power supply system. The power receiving device 2 includes a display unit 24. The power receiving device 2 that has received the modulated signal causes the demodulation processing unit 22 to perform demodulation processing and causes the display unit 24 to display the information signal obtained with the power signal in the form of at least visible or audible information. The display device 24 may be, for example, a display, a speaker, or the like.

Figure 12:
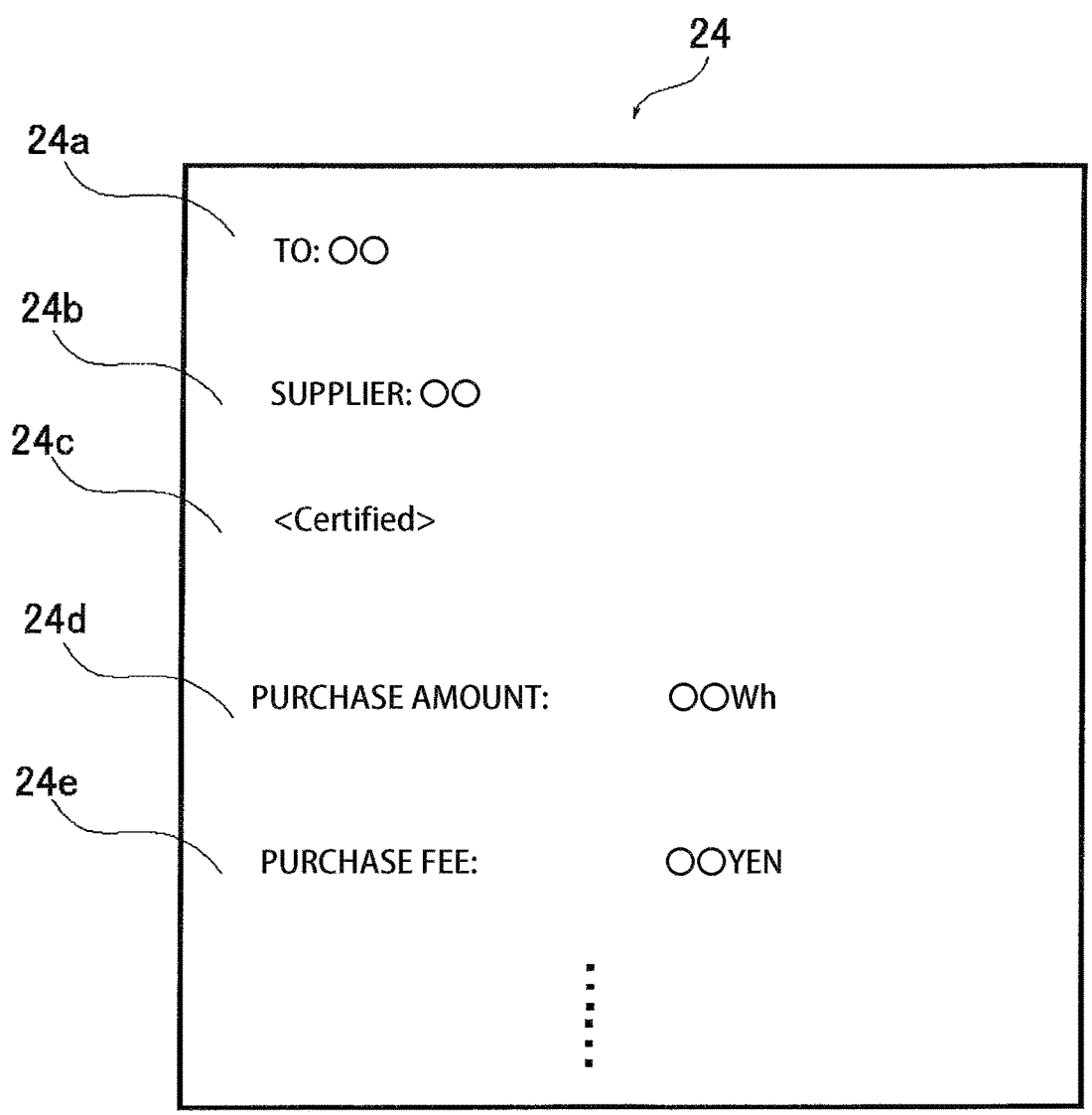
FIG. 12 is a diagram illustrating an example of a screen display of a display unit of a power receiving device according to the third embodiment.

As shown in FIG. 12, the display unit 24 displays predetermined information related to the power signal based on the information signal. FIG. 12 shows, as an example, receiver information 24a, transmission source information 24b, environmental value information 24c, electrical energy information 24d, and billing information 24e. Herein, the environmental value information will be explained. For example, an environmental additional value of electrical power generated by natural energy is certified by a third party certification organization, securitized by a security issuance business operator, and the security is issued as an environmental value certificate. The environmental value information indicates acquisition of this certificate or may indicate other information.

Fourth Embodiment

Figure 13:
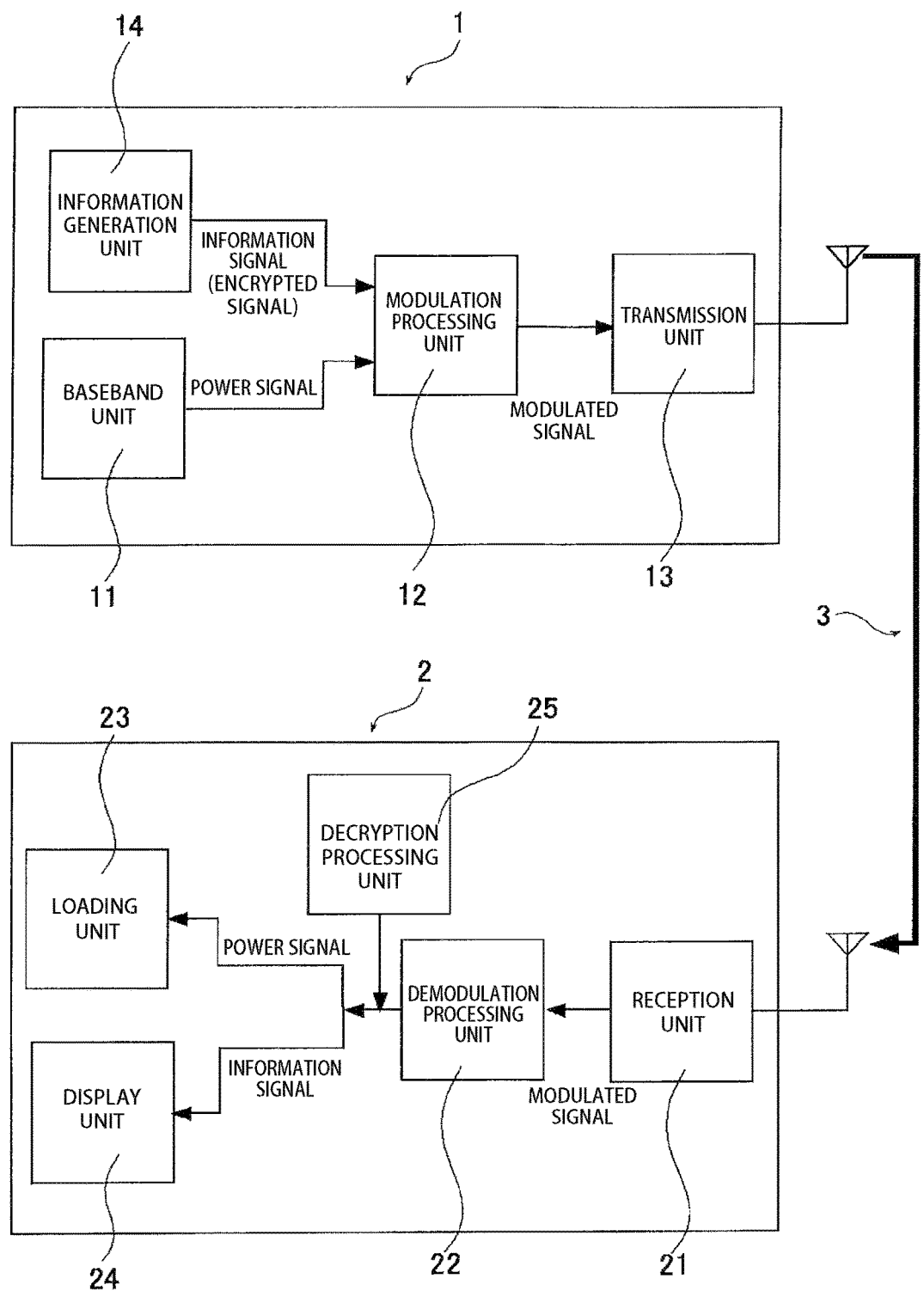
FIG. 13 is a block diagram illustrating a power supply system according to a fourth embodiment.

FIG. 13 is a block diagram illustrating a fourth embodiment of the power supply system. As shown in FIG. 13, an encrypted signal is generated in the information generation unit 14 of the power supply device 1, and an encrypted modulated signal is generated in the modulation processing unit 12. In the power receiving device 2, the encrypted modulated signal is demodulated by the demodulation processing unit, while being decrypted and deciphered by a decryption processing unit 25. By adding such processing, so-called power hacking can be prevented.

Fifth Embodiment

Figure 14:
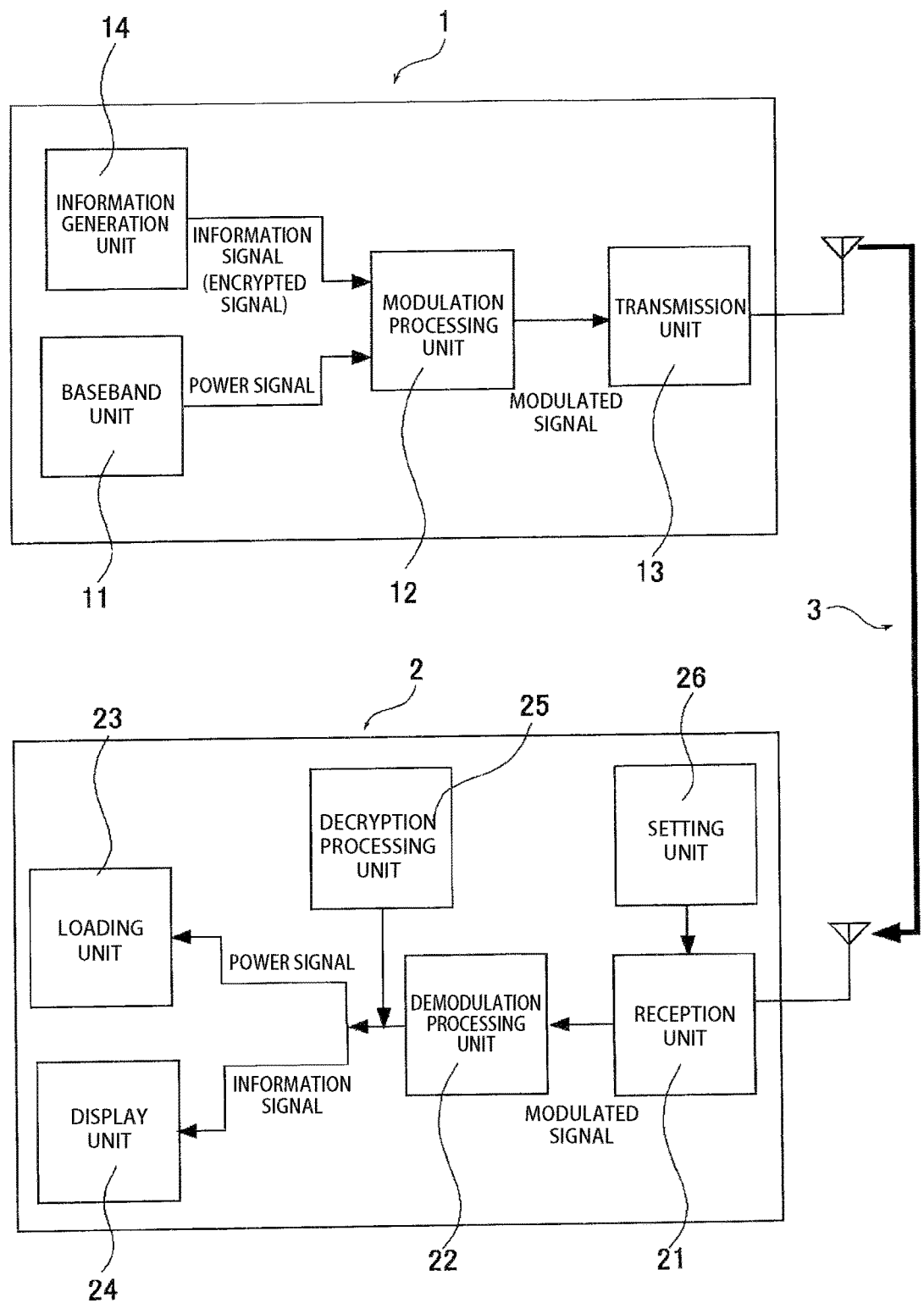
FIG. 14 is a block diagram illustrating a power supply system according to a fifth embodiment.

FIG. 14 is a block diagram illustrating a fifth embodiment of the power supply system. As shown in FIG. 14, the power receiving device 2 includes a setting unit 26 for receiving only a power signal in advance, which is based on predetermined power supply condition information. The information signals generated by the information generation unit 14 of the power supply device 1 include a power supply condition information signal. If the reception unit 21 of the power receiving device 2 receives the power supply condition information signal, it is determined whether the power supply condition information signal is a power signal based on the power supply conditions set by the setting unit 26. Only when the power signal is one based on the set power supply conditions, the received modulated signal is demodulated in the demodulation processing unit 22. The power supply condition information refers to, for example, power source certification information certifying that the electrical power to be supplied has been generated by renewable energy or fossil energy (power supply condition information for receiving only electrical power of a predetermined power source), power rate information (power supply condition information for receiving only electrical power of a predetermined power rate), and the like. In other words, the power supply condition information may only have to contribute to the consumer's determination as to whether the electrical power from the power supply device 1 should be received.

Figure 15:
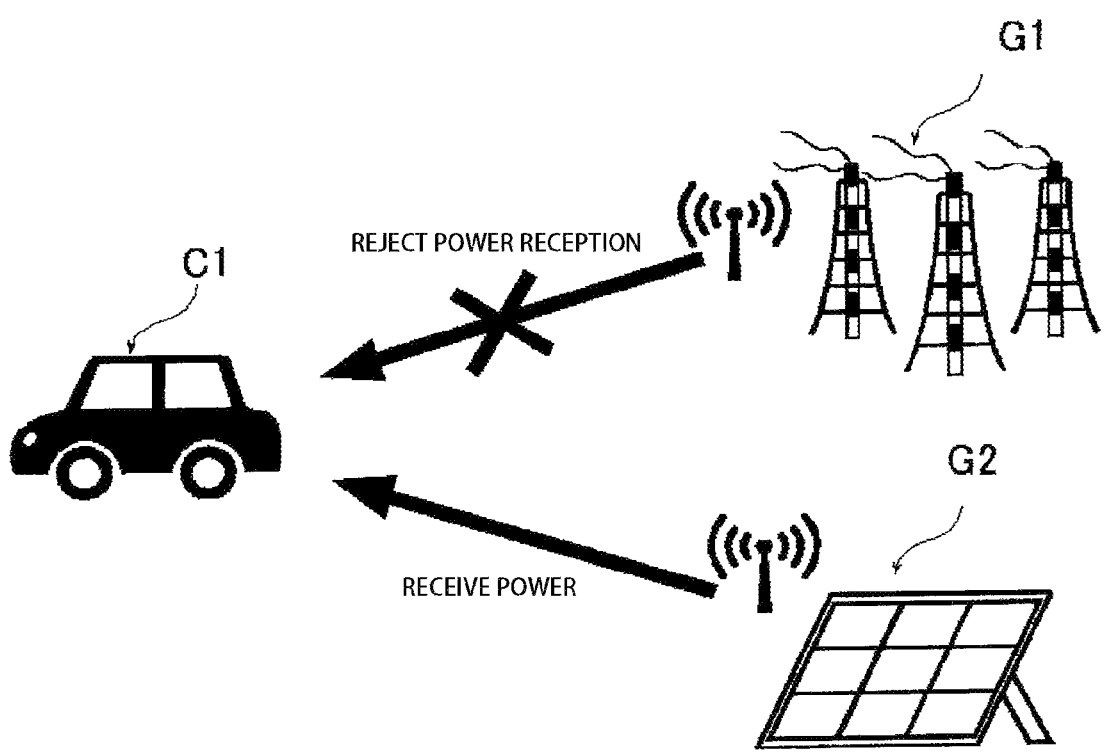
FIG. 15 is a schematic diagram illustrating a state in which electrical power is received only from a power supply device set by a setting unit of a power receiving device according to the fourth embodiment.

As shown in FIG. 15, let us assume a situation, for example, in which a vehicle C1 as a power receiving device receives power source certification information signals from both a power plant G1 and a power plant G2 as power supply devices, and the power source certification information of the power plant G1 shows the source as being fossil energy while that of the power plant G2 shows the source as being renewable energy (e.g., solar energy). In this situation, if the setting unit 26 of the vehicle C1 has been set to accept only renewable energy-derived power signals, the power signals from the power plant G1 are rejected and only the power signals from the power plant G2 are received.

Sixth Embodiment

Figure 16:
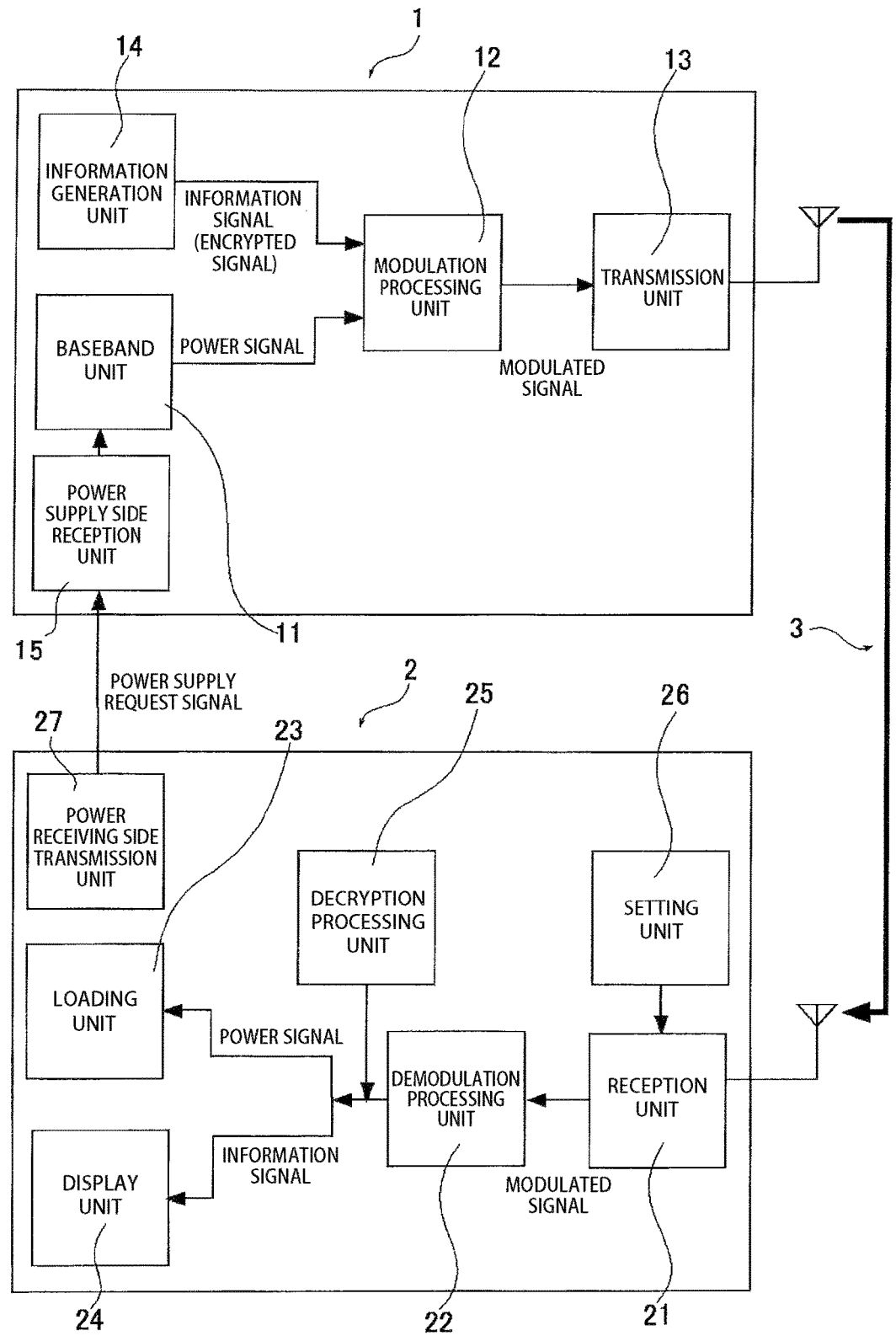
FIG. 16 is a block diagram illustrating a power supply system according to a sixth embodiment.

FIG. 16 is a block diagram illustrating a sixth embodiment of the power supply system. The power receiving device 2 includes a power receiving side transmission unit 27 that transmits a power supply request signal to a predetermined power supply device 1, and the power supply device 1 includes a power supply side reception unit 15 that receives the power supply request signal.

If a power supply request signal is received by the power supply side reception unit 15 transmitted from the power receiving side transmission unit 27 via a communication transmission line, such as the Internet, an oscillation circuit, for example, not shown, is started triggered by reception of the power supply request signal and a power signal is generated by the baseband unit 11.

The power supply request signal may be transmitted from the power receiving side transmission unit 27 in response to a predetermined threshold being reached in the power receiving device 2. The predetermined threshold may be at least a threshold of a state of charge of the power receiving device 2, an operating time of the power receiving device 2, or the like. For example, if the load connected to the power receiving device 2 corresponds to that of devices that are required to be constantly in operation, the state of charge, the operating time corresponding to the amount of charge, or the like is measured and a predetermined state of charge or a predetermined cumulative operating time is set in advance as a threshold, so that a power supply request signal can be transmitted when it is detected that the threshold has been reached.

Figure 17:
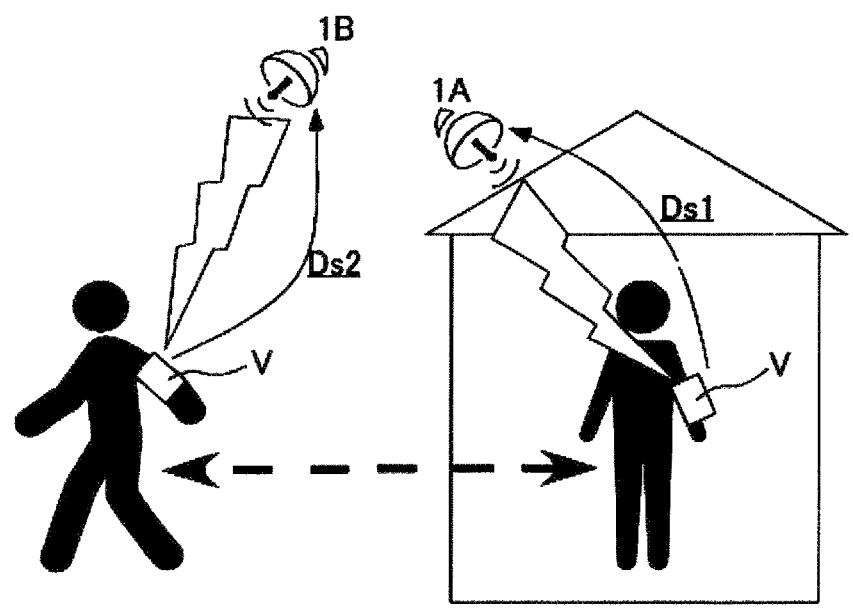
FIG. 17 is a diagram illustrating a specific example in which the power supply system according to the sixth embodiment is applied to a portable vital data measuring instrument.

FIG. 17 illustrates a portable vital data measuring instrument V which is worn, for example, on the arm of a person to be measured. If the person to be measured is indoors, the charging unit of the portable vital data measuring instrument V is connected to a power receiving device (not shown) and the state of charge or the cumulative operating time of the charging unit is detected. When the detected value has reached a predetermined threshold, a power supply request signal Ds1 is transmitted to an indoor power supply device 1A. Similarly, if the person to be measured is outdoors, a power supply request signal Ds2 is transmitted to an outdoor power supply device 1B when a detected value has reached a predetermined threshold.

The vital data (e.g., blood sugar level, blood pressure level, etc.) can be continuously measured to obtain their variation with environmental changes, so that the data can be used for correct medical diagnosis. However, it may be extremely cumbersome for a moving person to be measured to constantly confirm the state of charge of the portable vital data measuring instrument V. Even if an alert is set to be issued when a predetermined state of charge or cumulative operating time has been reached, without an available charging facility, the instrument cannot be charged and the continuous measurement is interrupted. In this regard, as shown in the present embodiment, continuous measurement can be achieved if the instrument can be automatically charged without the need for operation by the person being measured. FIG. 17 shows the case where there is only one person to be measured. However, for example, electrical power may be supplied to a plurality of persons being measured by linking the power supply request signals to the ID signals of the respective persons, so that these persons can be identified and electrical power can be supplied to them from one power supply device.

Furthermore, since electrical power can be frequently supplied to various devices, the charging facilities of the respective devices can be reduced in size (reduced in weight). For example, if the devices are smartphones, the operating time can be extended even if they are smaller in size. If the devices are moving objects, such as motor cars or unmanned aerial vehicles, their range can be extended.

Seventh Embodiment

Figure 18:
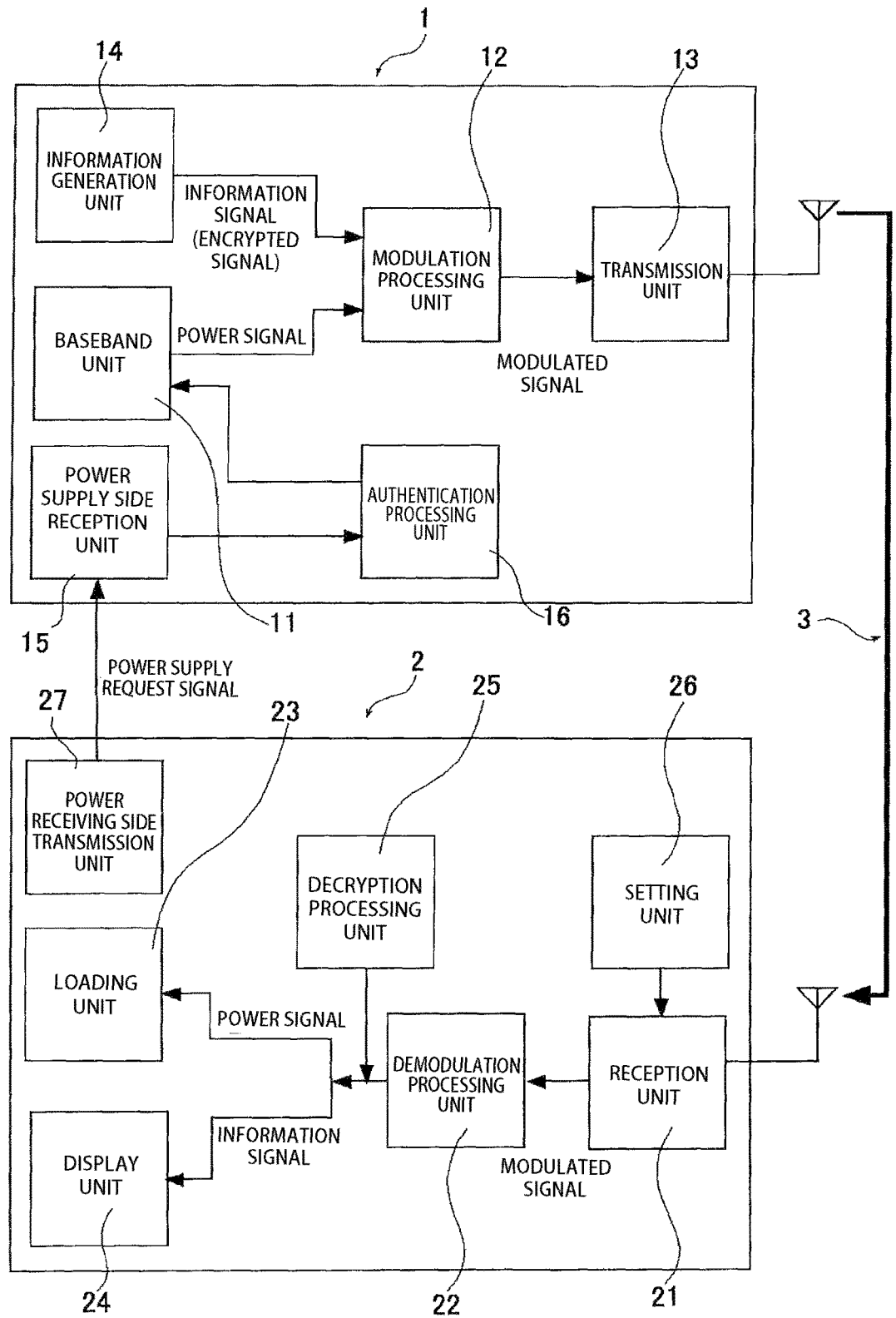
FIG. 18 is a block diagram illustrating a power supply system according to a seventh embodiment.

FIG. 18 is a block diagram illustrating a seventh embodiment of the power supply system. The power supply side reception unit 15 of the power supply device 1 receives a power supply request signal from the power receiving device 2 as described referring to FIG. 16. When such a power supply request signal is received, the power supply side reception unit 15 causes an authentication processing unit 16 to perform authentication processing to determine whether to supply electrical power to the power receiving device 2 which has transmitted the power supply request signal. Accordingly, the power receiving device 2 transmits authentication information (e.g., ID, password, etc.) required for the authentication processing together with the power supply request signal (not shown).

Other than performing the authentication processing in response to a power supply request signal from the power receiving device 2, it may be configured so that a transmission request for authentication information is sent to the power receiving device 2 whose reception unit 21 has received a modulated signal from the transmission unit 13 of the power supply device 1, and the authentication processing is performed when such authentication information has been received by the power supply side reception unit 15 (not shown).

Eighth Embodiment

Figure 19:
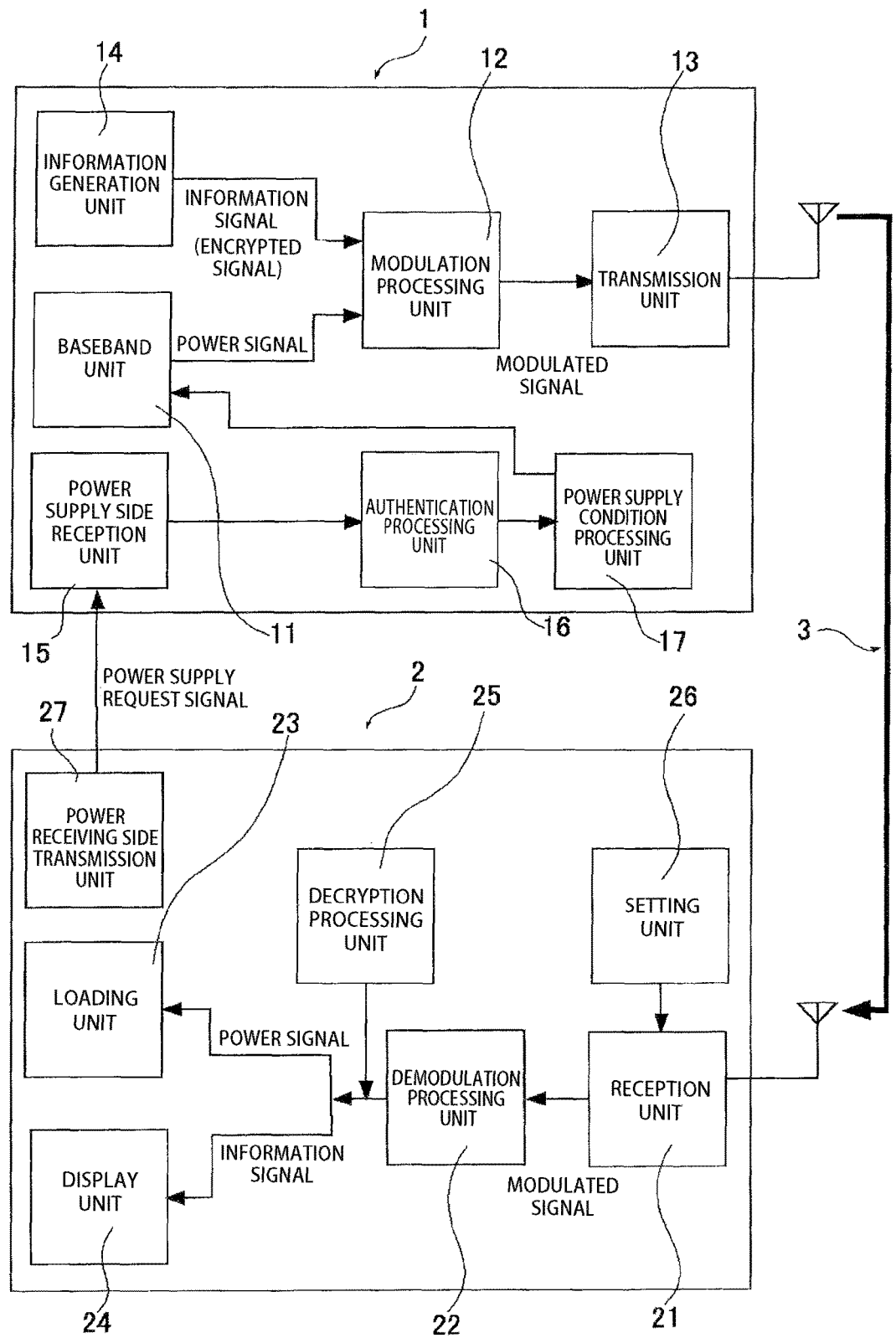
FIG. 19 is a block diagram illustrating a power supply system according to an eighth embodiment.

FIG. 19 is a block diagram illustrating an eighth embodiment of the power supply system. The power supply device 1 includes a power supply condition processing unit 17 that changes power supply conditions depending on whether the power supply device 2 has been authenticated or not authenticated by the authentication processing unit 16 described referring to FIG. 18. The power supply condition processing unit 17 causes the baseband unit 11 to generate power signals based on different power supply conditions according to approval or rejection of the authentication. For example, if power signals are transmitted to all the vehicles that pass through a predetermined place, such as a drive-through, the authentication processing unit 16 may identify members and non-members of the store that offers the drive-through, and the power supply condition processing unit 17 may change the amount of electrical energy supply to the vehicles or may perform other processing.

Figure 20:
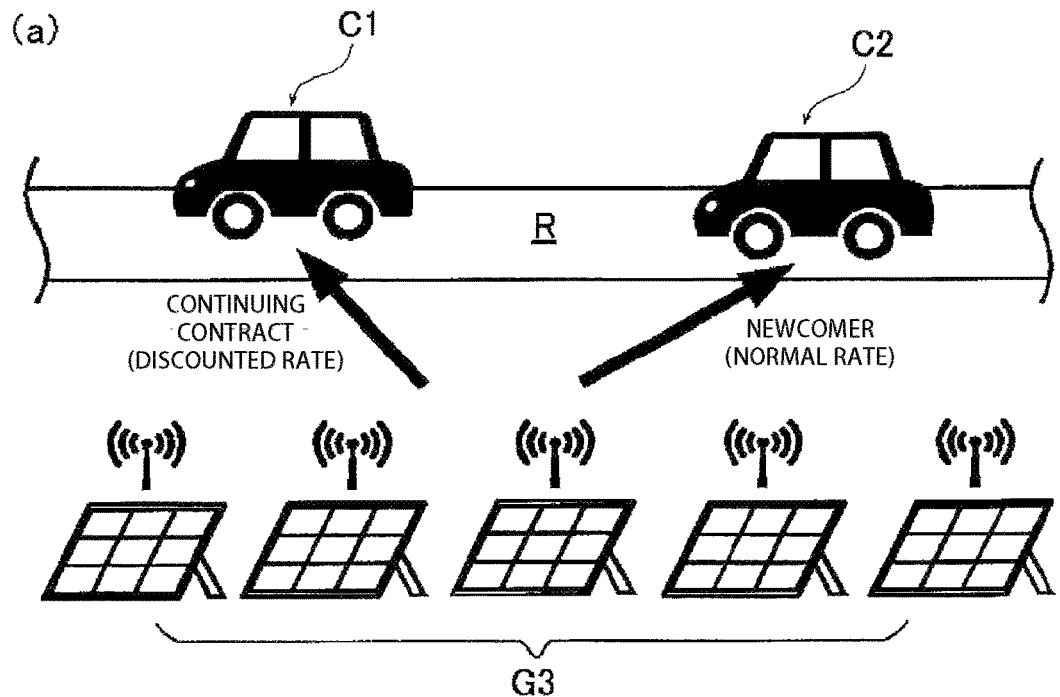
FIG. 20 is a set of diagrams each illustrating a state in which electrical power is supplied to power receiving devices having different power supply conditions using a power supply condition processing unit of the power supply system according to the eighth embodiment, in which (A) is a diagram illustrating a state in which electrical power is supplied to a vehicle passing a predetermined place by varying the electrical energy between an authenticated vehicle and an unauthenticated vehicle and (B) is a diagram illustrating a state in which power receiving devices are prioritized and electrical power is supplied by varying the electrical energy according to the prioritization.
Figure 20:
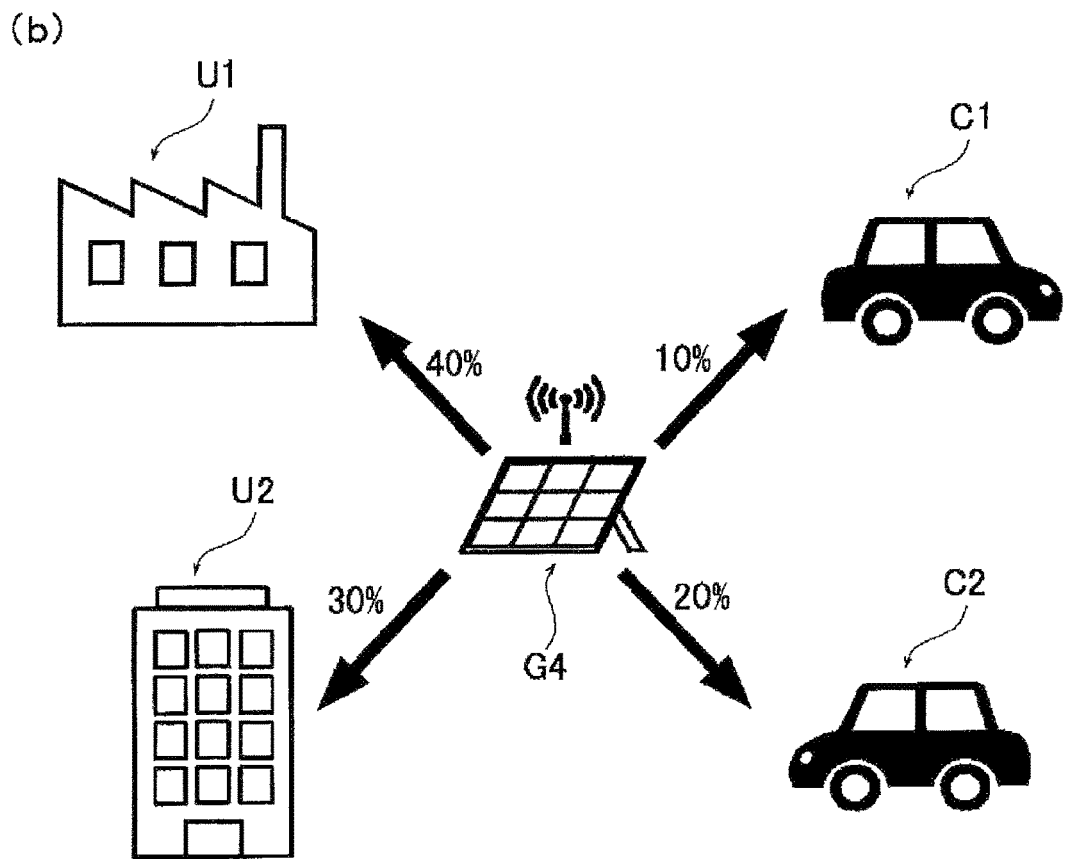

FIG. 20 is a set of diagrams illustrating examples of processing performed by the power supply condition processing unit 17. FIG. 20(A) is a diagram illustrating a situation in which electrical power is supplied from a solar power generator group G3, as a power supply device, established in a predetermined passage area (road R) to a vehicle C1 that always uses the road R and a vehicle C2 that happens to use the road R, as power receiving devices, while performing processing for changing power supply conditions to change billing among these vehicles for the electrical power supplied from the solar power generator group G3. Specifically, the vehicle C1, which signed a continuing contract and has an ID as a customer, is authenticated by the authentication processing unit 16 and is billed by the power supply condition processing unit 17 at a discounted rate under the continuing contract. On the other hand, the vehicle C2, which has no ID as a customer, is not authenticated by the authentication processing unit 16 and is billed by the power supply condition processing unit 17 at a regular rate.

FIG. 20(B) is a diagram illustrating a situation in which electrical power is supplied from a solar power generator G4, as a power supply device, to power receiving devices (vehicle C1, vehicle C2, fixed equipment U1, and fixed equipment U2) as power supply destinations. In this case, the authentication processing unit 16 performs authentication processing for these power receiving devices to individually identify them, and the power supply condition processing unit 17 prioritizes the power receiving devices in terms of supply power to change the amounts of electrical energy to be supplied to them. Specifically, instead of evenly dividing a total amount of supply power of the solar power generator G4 at some point of time between the four power receiving devices as power supply destinations, electrical power is supplied to them with different amounts according to the prioritization. The present embodiment shows that, of the total amount of supply power of the solar power generator G4, 10% is supplied to the vehicle C1, 20% is supplied to the vehicle C2, 40% is supplied to the fixed equipment U1, and 30% is supplied to the fixed equipment U2.

Ninth Embodiment

Figure 21:
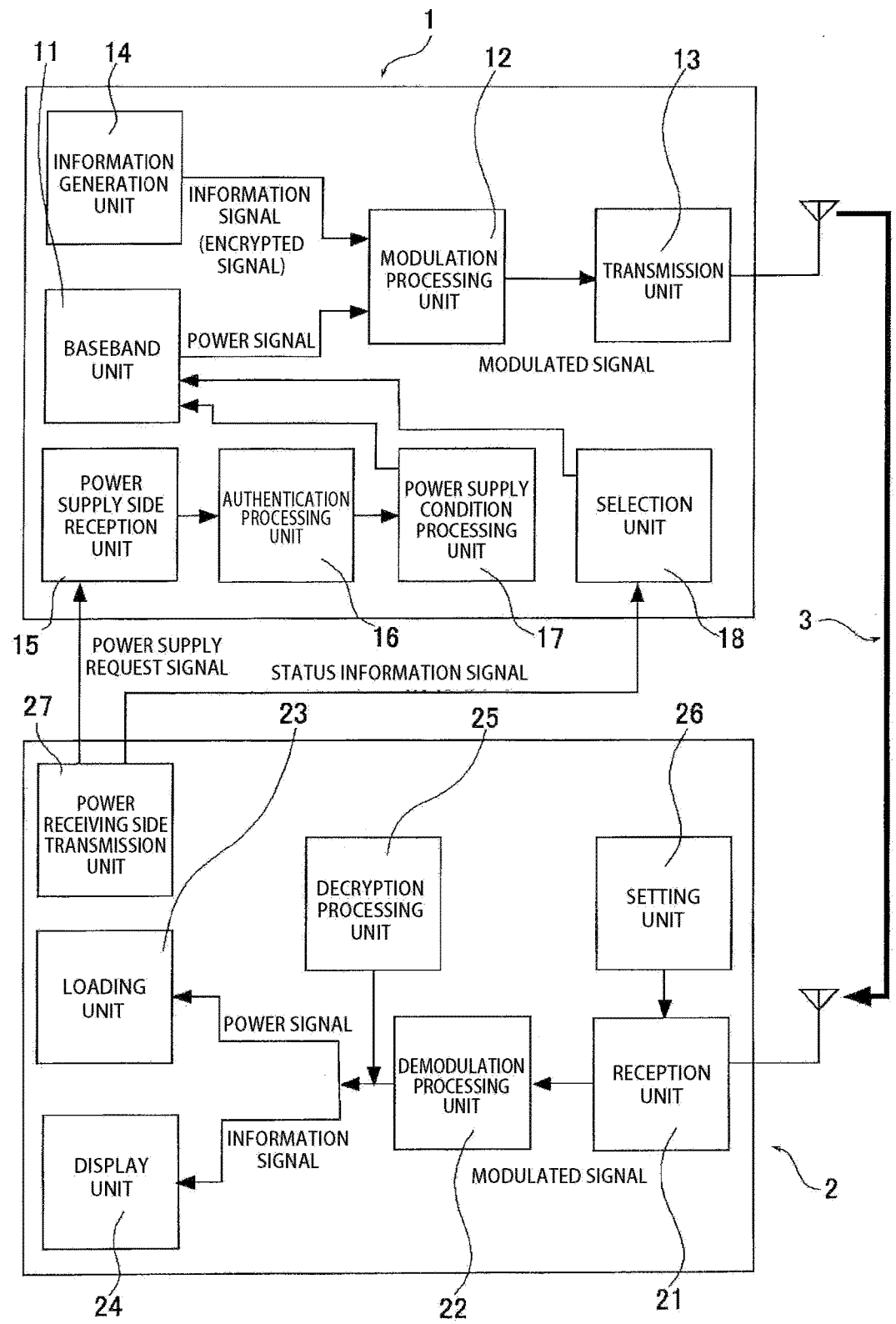
FIG. 21 is a block diagram illustrating a power supply system according to the eighth embodiment.

FIG. 21 is a block diagram illustrating a ninth embodiment of the power supply system. The power supply device 1 includes a selection unit 18 that checks power receiving side status information received from the power receiving side transmission unit 27 of each power receiving device 2 against power supply side status information held by the power supply device 1, and selects a power receiving device 2 as a power supply destination if the power receiving side status information transmitted from this power receiving device 2 has a predetermined relation with the power supply side status information. The status information refers to, for example, information that changes with time, such as positions of moving objects (distance between the power supply device 1 and the power receiving device 2), time (e.g., daylight hours if the power supply means uses renewable energy), and amount of change in positions (traveling speeds if the power supply device 1 and the power receiving device 2 are moving objects). The predetermined relation refers to, for example, a relation enabling efficient power supply such as the case in which the power supply device 1 and the power receiving device are moving objects and their moving directions are the same or approximated.

Figure 22:
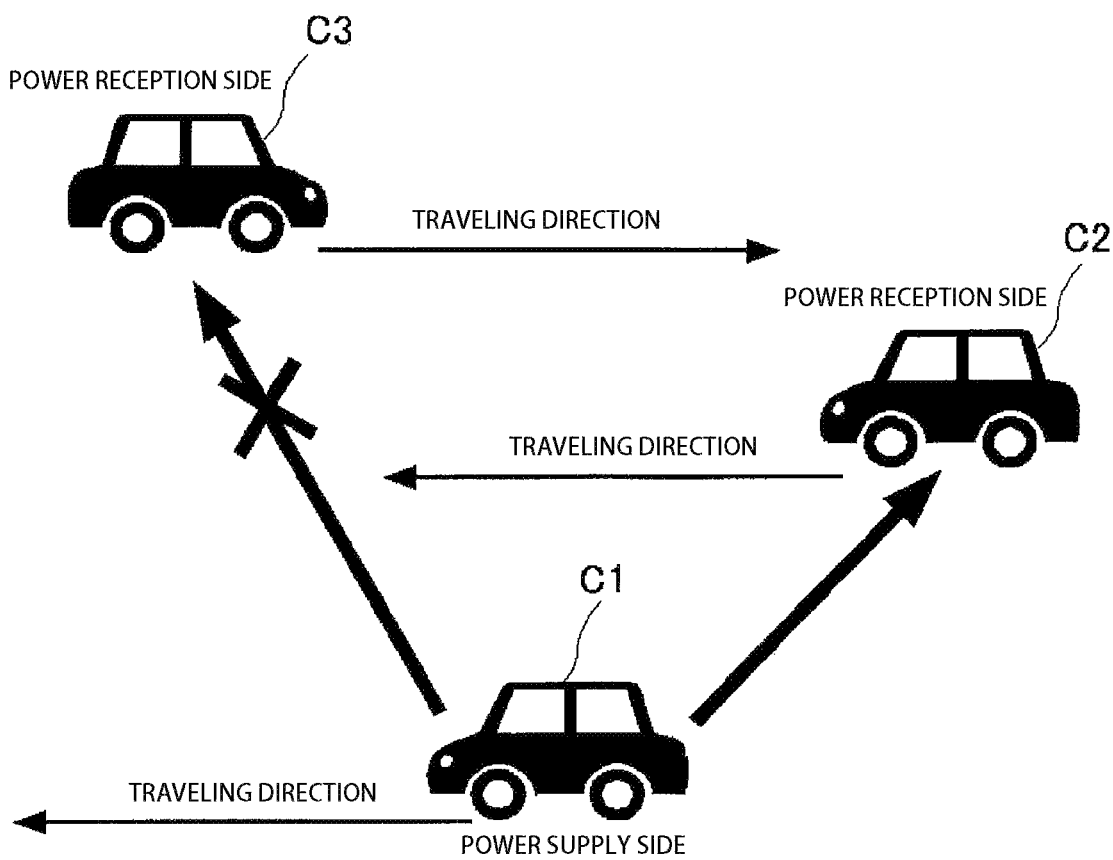
FIG. 22 is a schematic diagram illustrating a state in which a power supply target is selected by a selection unit of the power supply device of the power supply system of the eighth embodiment according to a status information signal received from a power receiving unit to supply electrical power thereto.

FIG. 22 is a diagram illustrating an example in which the predetermined relation of the status information is moving directions of moving objects. Specifically, FIG. 22 illustrates a situation in which a power supply vehicle C1 travels in a predetermined direction, and there are a power receiving vehicle C2 traveling in the same direction as the power supply vehicle C1 and a power receiving vehicle C3 traveling in an opposite direction to the power supply vehicle C1. In this case, the selection unit 18 of the power supply side vehicle C1 receives power receiving side status information from the power receiving vehicle C2 indicating traveling in the same direction, while receiving power receiving side status information from the power receiving vehicle C3 indicating traveling in an opposite direction. The selection unit 18 checks the power supply side status information of its own against the two pieces of power receiving side status information, determines that the power receiving side status information of the power receiving vehicle C2 has a predetermined relation of traveling in the same direction, and selects the power receiving vehicle C2 as a power supply destination. The power receiving vehicle C3 that has transmitted the power receiving side status information indicating traveling in an opposite direction is determined to be in a status not suitable for being selected as a power supply destination, from the perspective of efficiency when compared to the relation with the power receiving vehicle C2, and therefore the power supply vehicle C1 rejects power supply to the power receiving vehicle C3.

Tenth Embodiment

Figure 23:
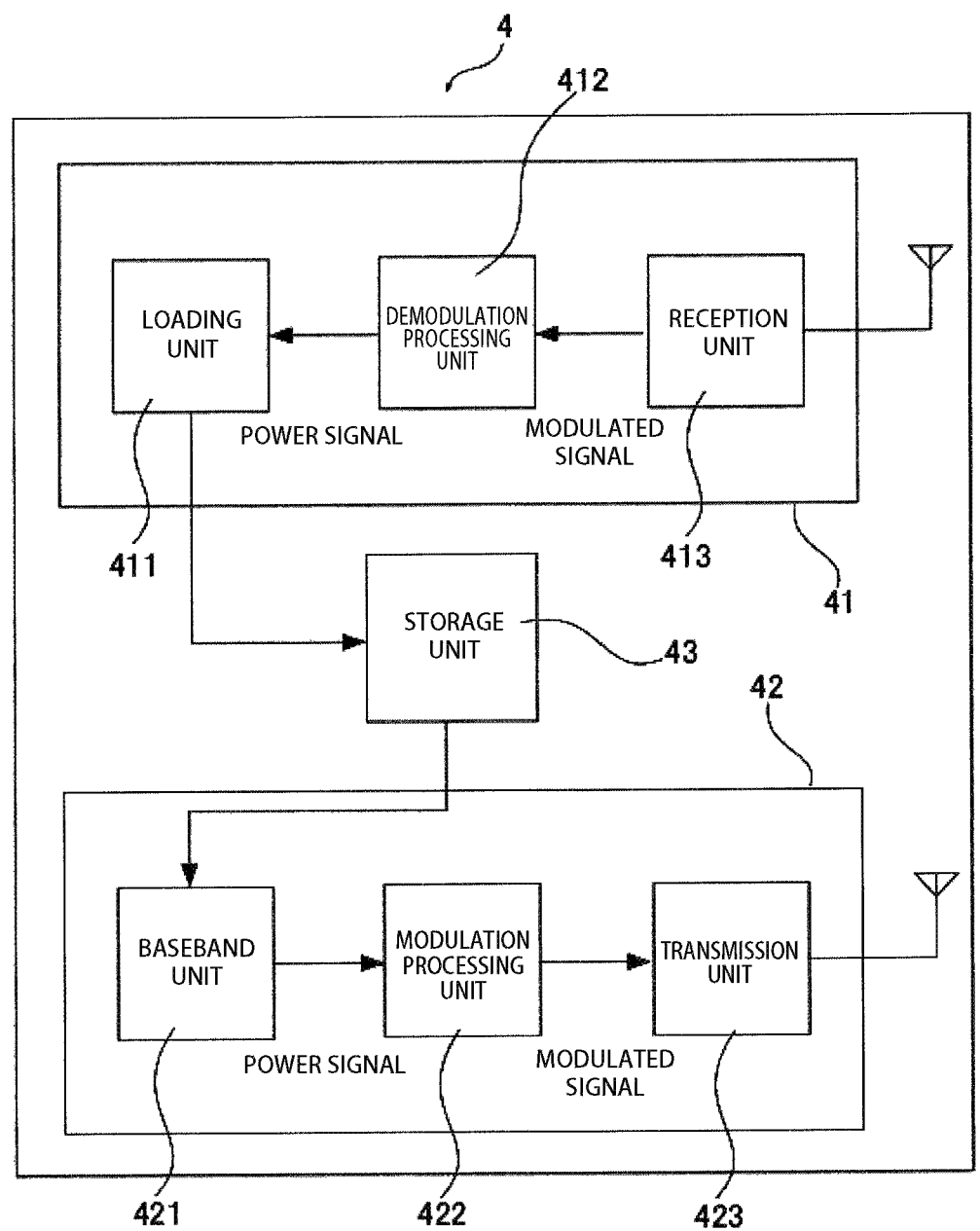
FIG. 23 is a block diagram illustrating a power supply system according to a ninth embodiment.

FIG. 23 is a block diagram illustrating a power receiving and supply device 4 configuring a tenth embodiment of the power supply system. The power receiving and supply device 4 is capable of receiving electrical power from the power supply device 1 and supplying electrical power to the power receiving device 2. The power receiving and supply device 4 mainly serves as a relay device (node) in a power supply network described later. The power receiving and supply device 4 has a configuration that is a combination of the configurations of the power supply device 1 and the power receiving device 2. Specifically, the power receiving and supply device 4 includes a power receiving unit 41 including a reception unit 413, a demodulation processing unit 412, and a loading unit 411, and includes a power supply unit 42 including a baseband unit 421, a modulation processing unit 422, and a transmission unit 423 (The present embodiment shows the same mode as the first embodiment; however, the mode may be the same as any of the second to ninth embodiments.)

The power receiving and supply device 4 of the present embodiment may include a storage unit 43 which stores a part or all of the received electricity. Electrical power received by the power receiving and supply device 4 can be stored in the storage unit 43 and can be supplied to another power receiving device 2 or power receiving and supply device 4 at desired timing.

Figure 24:
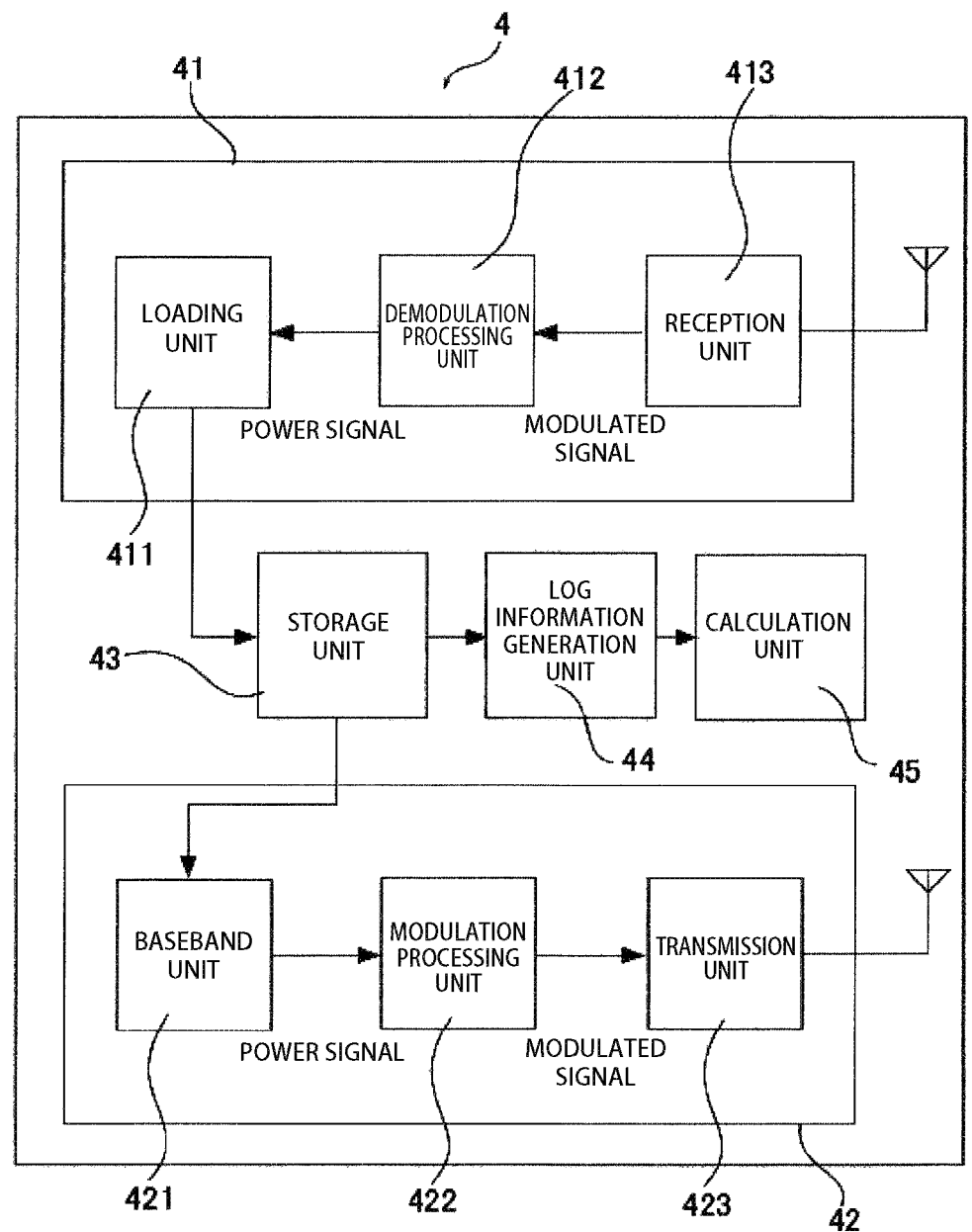
FIG. 24 is a block diagram illustrating a power supply system according to a tenth embodiment.
Figure 25:
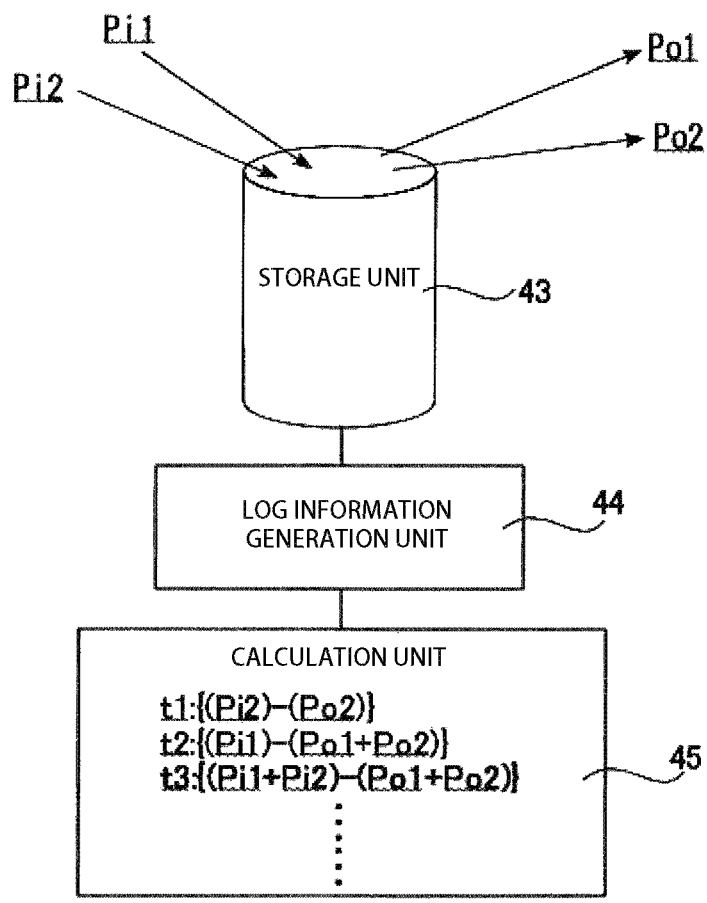
FIG. 25 is a diagram illustrating processing performed by a power storage unit, a log information generation unit, and a calculation unit when performing power reception/supply and performing power supply in the power supply system according the tenth embodiment.

FIG. 24 is a first modification of the power receiving and supply device 4 according to the tenth embodiment. The present modification includes at least a log information generation unit that generates power reception source information, an amount of received power, power supply destination information, and an amount of supplied power at predetermined time intervals, and a calculation unit that calculates a difference between the amount of received power and the amount of supplied power. Specifically, as shown in FIG. 25, if the power receiving and supply device 4 receives power Pi1 and power Pi2 at some time (t3) and stores these powers in the storage unit 43 and at the same time supplies power Po1 and power Po2, the log information generation unit 44 generates log information related to power reception and power supply, and the calculation unit 45 calculates a difference between the amount of received power and the amount of supplied power. Thus, the power receiving and supply device 4, which sequentially calculates the amounts of received and supplied power as a node of a power supply network described later, can supply data that contributes to dynamic measurements of power supply efficiency of the entire power supply network.

Figure 26:
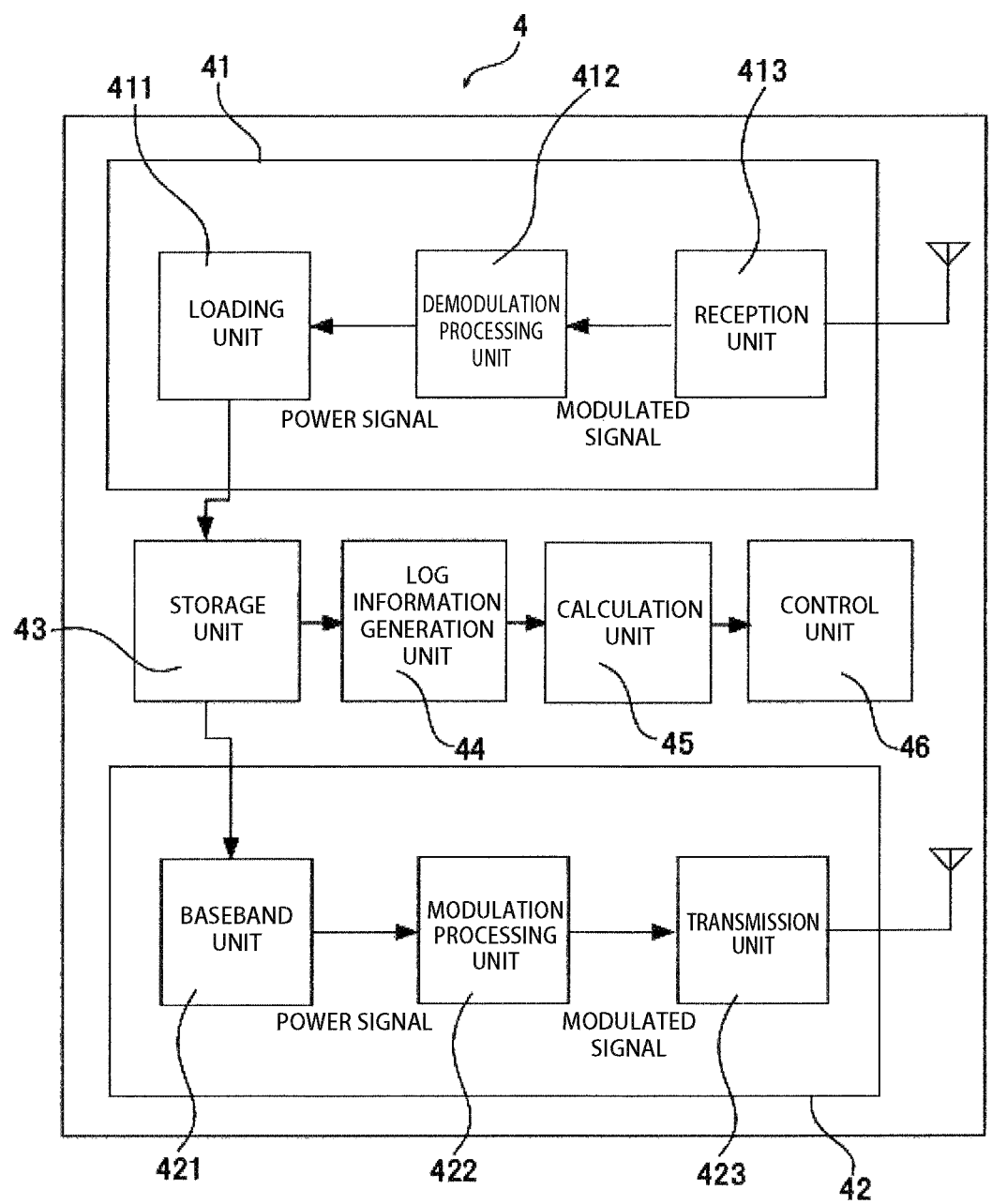
FIG. 26 is a block diagram illustrating a modification of the power supply system according to the tenth embodiment.

FIG. 26 shows a second modification of the power receiving and supply device 4. The power receiving and supply device 4 includes a control unit 46 that distributes received electrical power to a plurality of loads as necessary from the power receiving and supply device 4. The control unit 46 distributes electrical power to complement the electrical power distributed from existing distribution plants other than the power receiving and supply device 4 to the plurality of loads.

Figure 27:
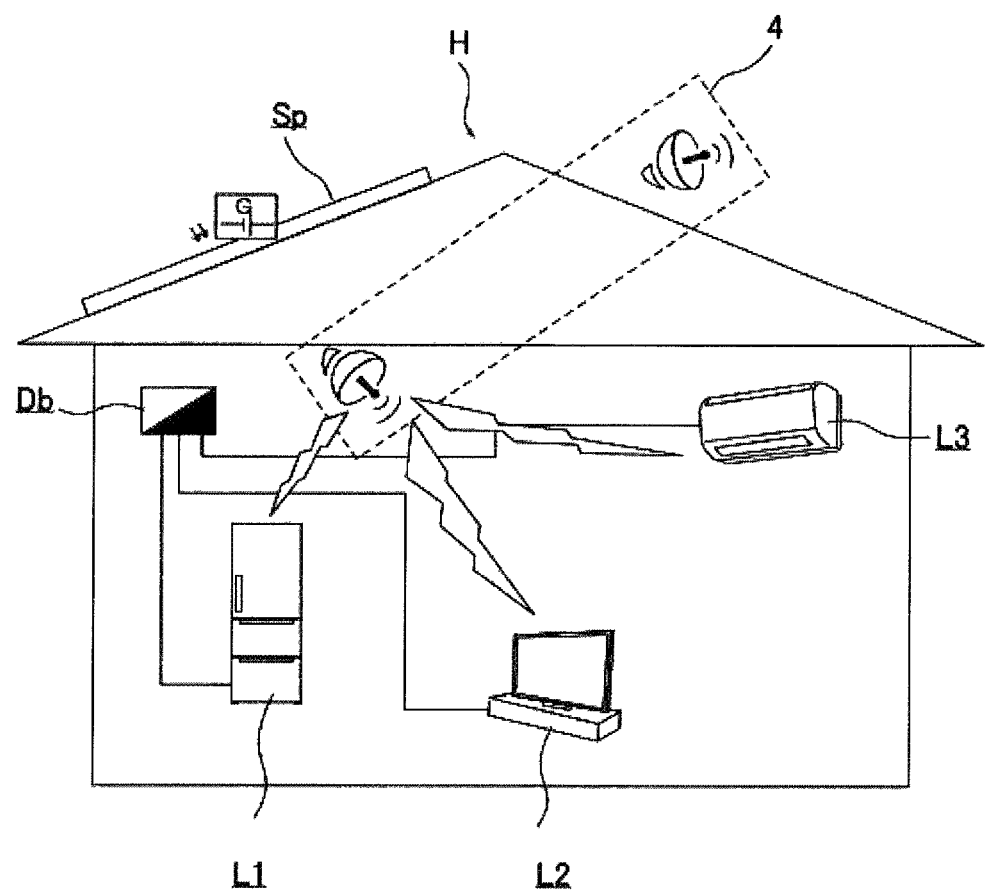
FIG. 27 is a schematic diagram illustrating a specific example in which the power supply system according to the tenth embodiment is applied to a smart home.

FIG. 27 is a diagram illustrating a specific example of the second modification. The power receiving and supply device 4 is installed in a smart home H. The control unit 46 of the power receiving and supply device 4 supplies electrical power to loads L1 to L3 (L1 is a refrigerator, L2 is a television set, and L3 is an air conditioner in the present modification) used in the smart home. Also, the control unit 46 distributes electrical power to complement the electrical power distributed to the loads L1 to L3 from existing power distribution plants (solar panels Sp or existing distribution plants supplying electrical power from the distribution line of an electrical power company via a distribution board Db). For example, the control unit 46 may monitor excess of an ampere capacity according to an existing power contract and, if there is a possible excess, may switch only predetermined loads to receive power supply from the power receiving and supply device 4.

Alternatively, the control unit 46 may monitor power consumption of the entire smart home H to control standby power of the loads. Furthermore, the control unit 46 may monitor power consumption of the entire smart home H and activate the power supply unit 42 to sell surplus electrical power. In this case, information of power sales destinations can be obtained by the log information generation unit 44 and the calculation unit 45.

The power receiving and supply device 4 may have a form in which the power receiving unit 41 is integrated with the power supply unit 42 or may have a form in which the power receiving unit 41 and the power supply unit 42 are separately formed and connected to each other.

Eleventh Embodiment

Figure 28:
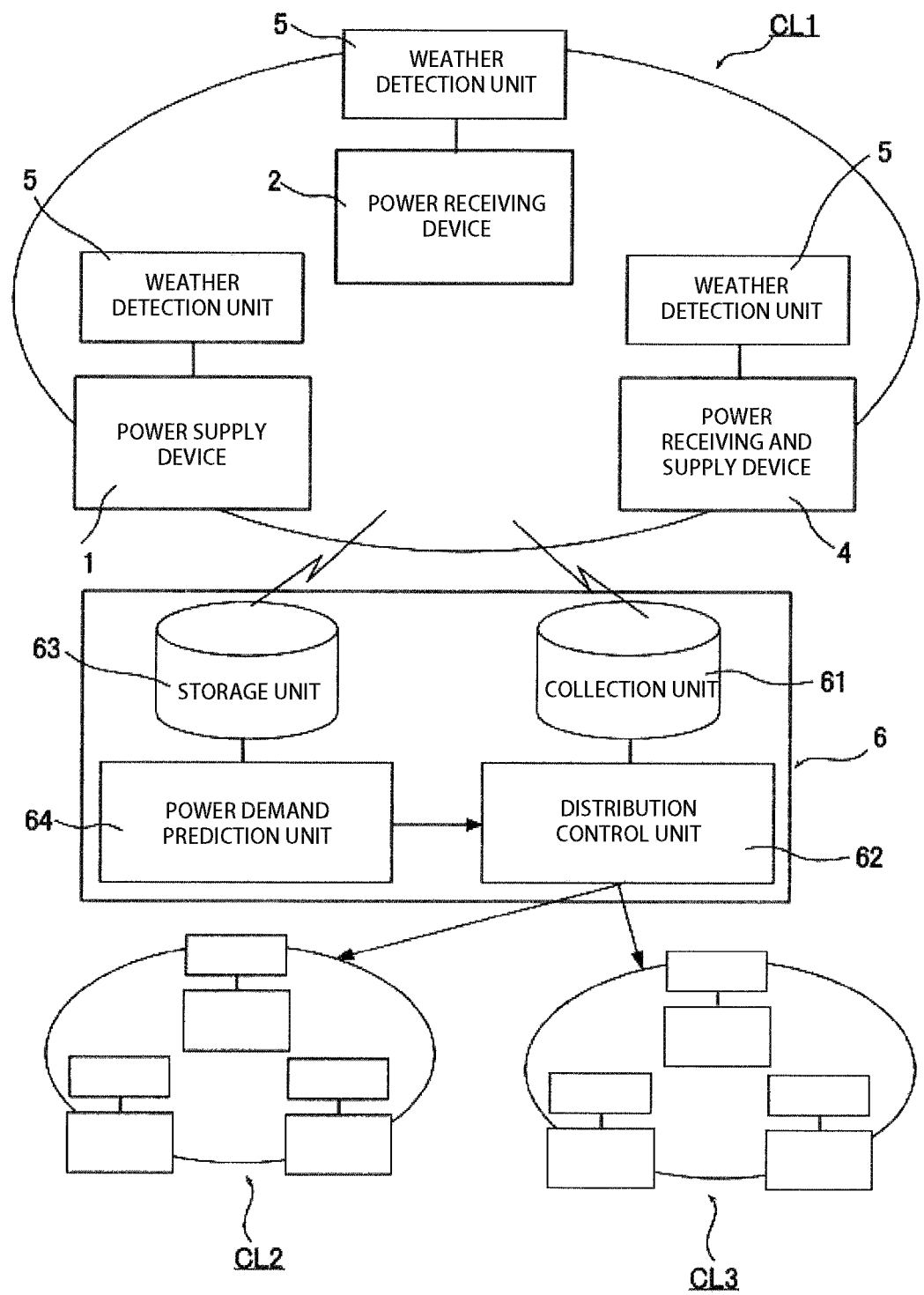
FIG. 28 is a block diagram illustrating a power supply system according to an eleventh embodiment.

FIG. 28 is a block diagram illustrating an eleventh embodiment of the power supply system. In the present embodiment, a plurality of power supply devices 1, power receiving devices 2, and power receiving and supply devices 4 in a predetermined area are formed as a cluster CL1. The present embodiment includes a collection/distribution server 6 which includes a collection unit 61 that collects supply power from the cluster CL1, and a distribution control unit 62 that supplies the collected supply power to other clusters CL2 and CL3.

As shown in FIG. 28, the power supply device 1, the power receiving device 2, and the power receiving and supply device 4 each include a weather detection unit 5 to detect various weather data in the respective locations. The weather data include, for example, but are not limited to, temperature data, moisture data, atmospheric pressure data, wind direction data, daylight hours data, and crustal movement data. The weather detection units 5 are each provided with electrical power by the power supply device 1 or the power receiving and supply device 4 so as to be constantly in operation. The collection/distribution server 6 includes a storage unit 63 that stores weather data detected by the weather detection units 5, and a power demand prediction unit 64 that predicts excess/deficiency data of electrical power of other cluster units based on the stored weather data. The power demand prediction unit 64 may, for example, predict power demand of each cluster unit using past data showing correlation between change of weather data and power consumption.

The distribution control unit 62 calculates excess/deficiency data based on the power demand predicted by the power demand prediction unit 64, and supplies electrical power to the cluster expected to be short of electrical power.

In the present embodiment, the collection unit 61, the distribution control unit 62, the storage unit 63, and the power demand prediction unit 64 are described as being elements configuring the collection/distribution server 6; however, these elements may be formed as separate devices and connected to each other. Also, the present embodiment has been described using an example in which weather data is detected by each weather detection unit 5; however, it may be configured so that, without being limited to weather data, satellite data or other data contributing to power demand prediction is detected (data detection unit).

Figure 29:
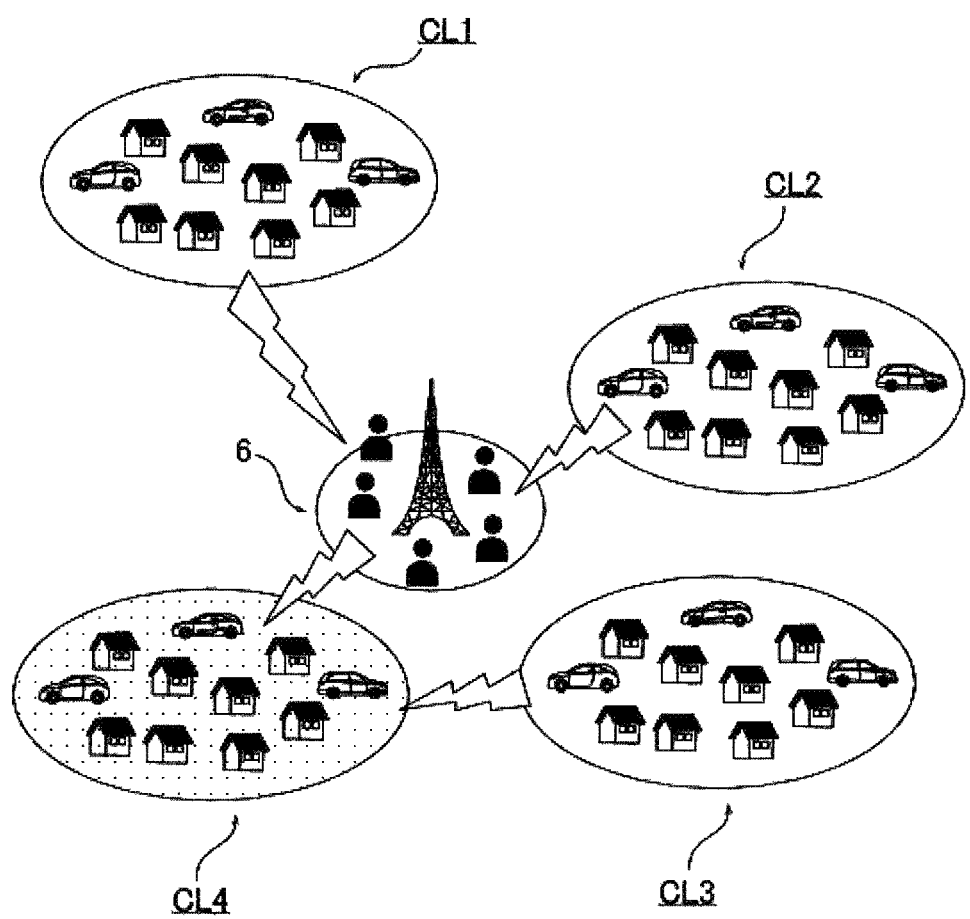
FIG. 29 is a schematic diagram illustrating a specific example in which the power supply system according to the eleventh embodiment is applied to a smart city.

FIG. 29 shows a specific example in which the power supply system shown in FIG. 28 is formed in a smart city. As shown, clusters CL1 to CL4 are formed. The power supply device 1, the power receiving device 2, or the power receiving and supply device 4 forming each cluster may be not only a smart home as illustrated in FIG. 27, but also a moving object, such as a vehicle, temporarily present in the cluster. If a smart city is formed as in the present embodiment, each area (cluster) unit is able to effectively and timely support other areas (clusters) for power supply if any of them suffers a disaster. The present embodiment shows that the clusters CL1 to CL3 support the cluster CL4 for power supply. As does the cluster CL3, electrical power may be directly supplied to the cluster CL4 without going through the collection/distribution server 6.

The present embodiment, with which micro-level weather data can be acquired in bulk, is expected to contribute to improving accuracy of weather forecast.

In the present embodiment, the collection/distribution server 6 is located in an area that belongs to none of the clusters, but may be located in any of the clusters. In any case, it may be designed so that various devices (moving objects, in particular) can be provided with electrical power in areas around the site where the collection/distribution server 6 is established.

Furthermore, data obtained from portable vital data measuring instruments V described referring to FIG. 17 can be tallied for each cluster unit. By acquiring and tallying vital data of inhabitants for each area, area characteristics related to health can be identified, and this is expected to contribute to providing medical services to the area.

Twelfth Embodiment

Figure 30:
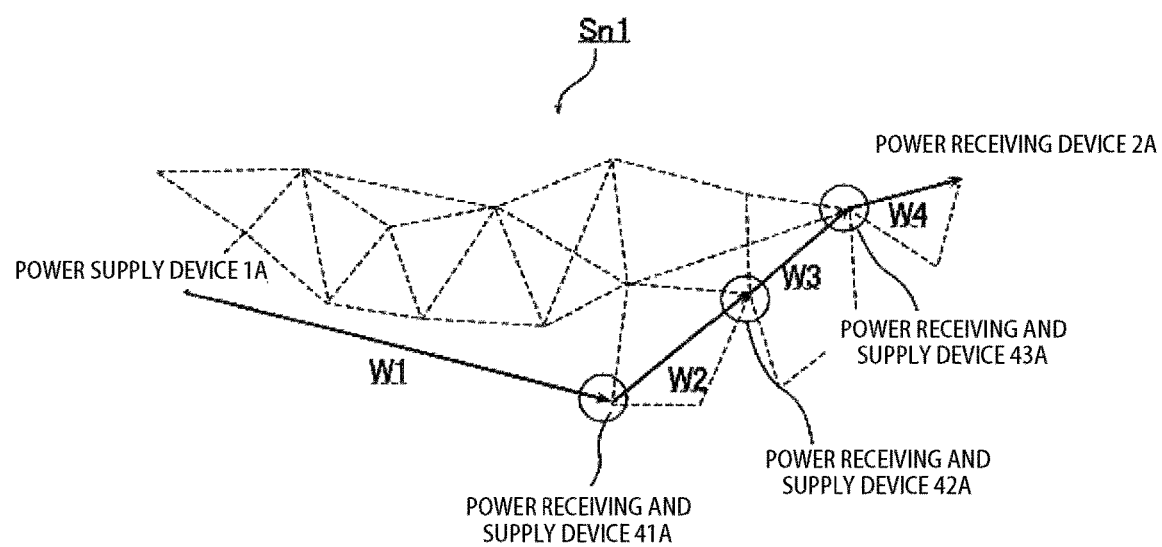
FIG. 30 is a schematic diagram illustrating a supply system based on selection of a shortest path of a power supply system.
Figure 31:
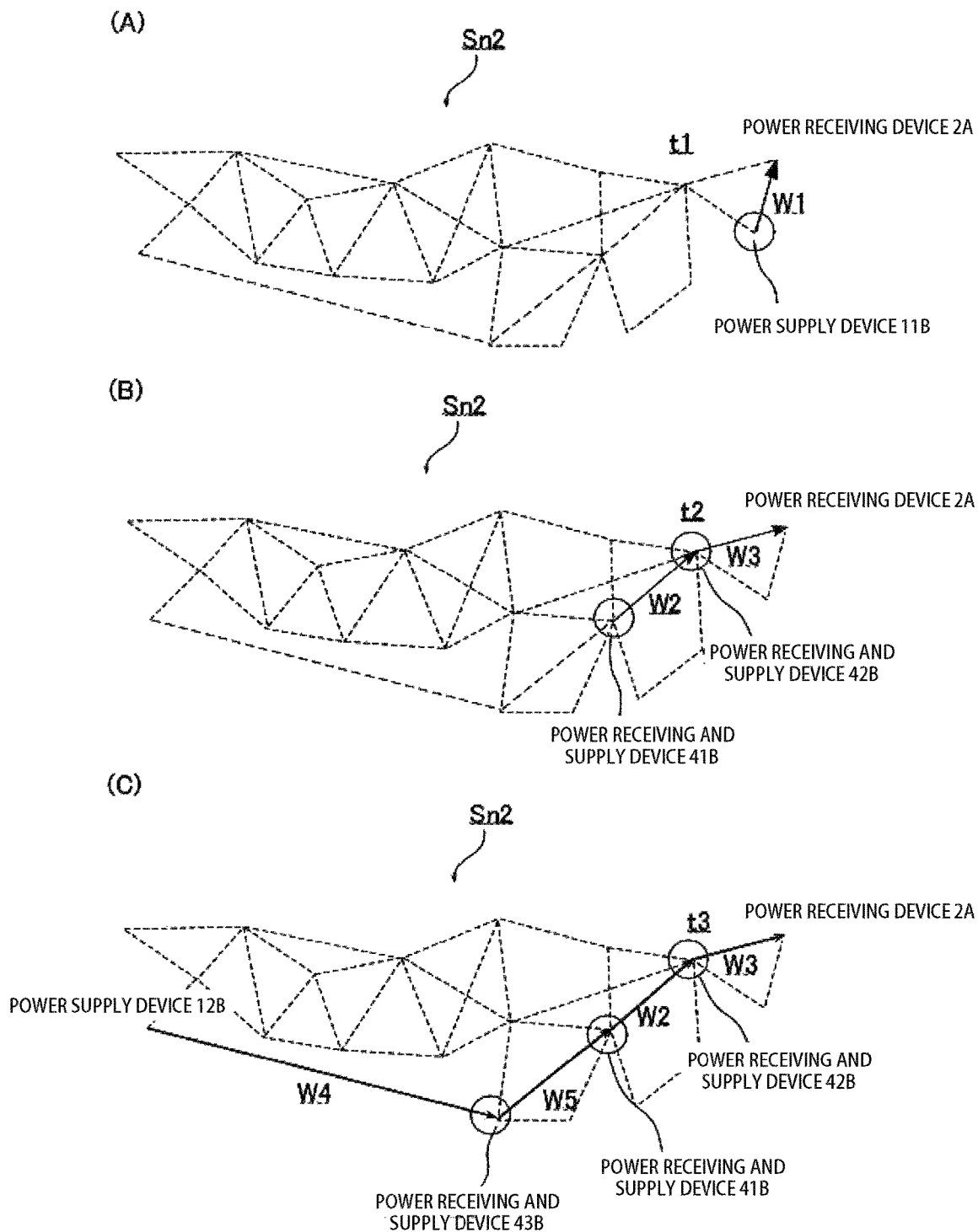
FIG. 31 is a set of schematic diagrams each illustrating a power supply system based on selection of dynamic paths of the power supply system, in which (A) illustrates path selection at time t1, (B) illustrates path selection at time t2 and (C) illustrates path selection at time t3.
Figure 32:
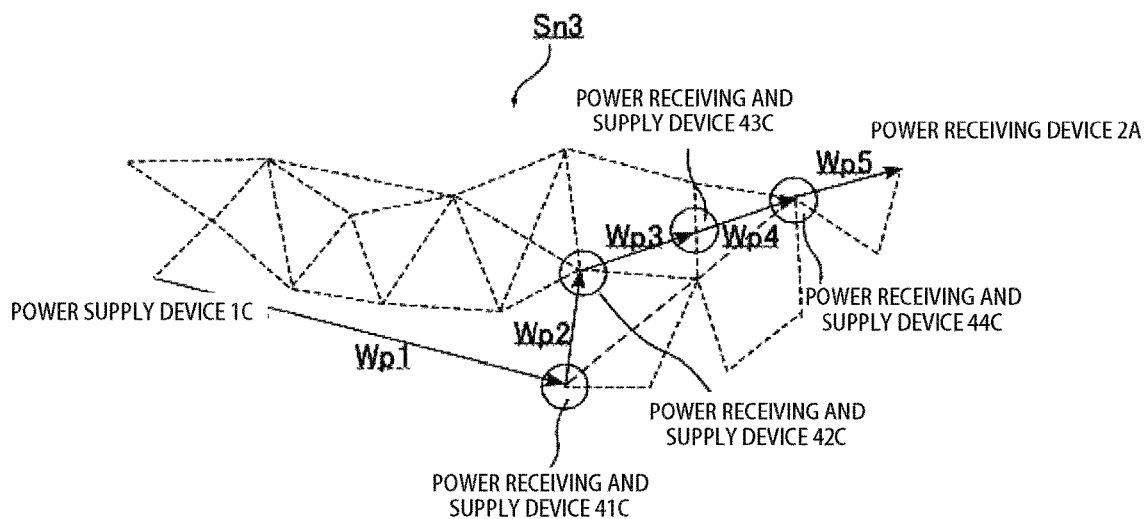
FIG. 32 is a set of schematic diagrams each illustrating a supply system based on path selection according to priority conditions of the power supply system, in which (A) illustrates path selection according to power receiving device side priority conditions and (B) illustrates path selection according to power supply device side priority conditions.
Figure 32:
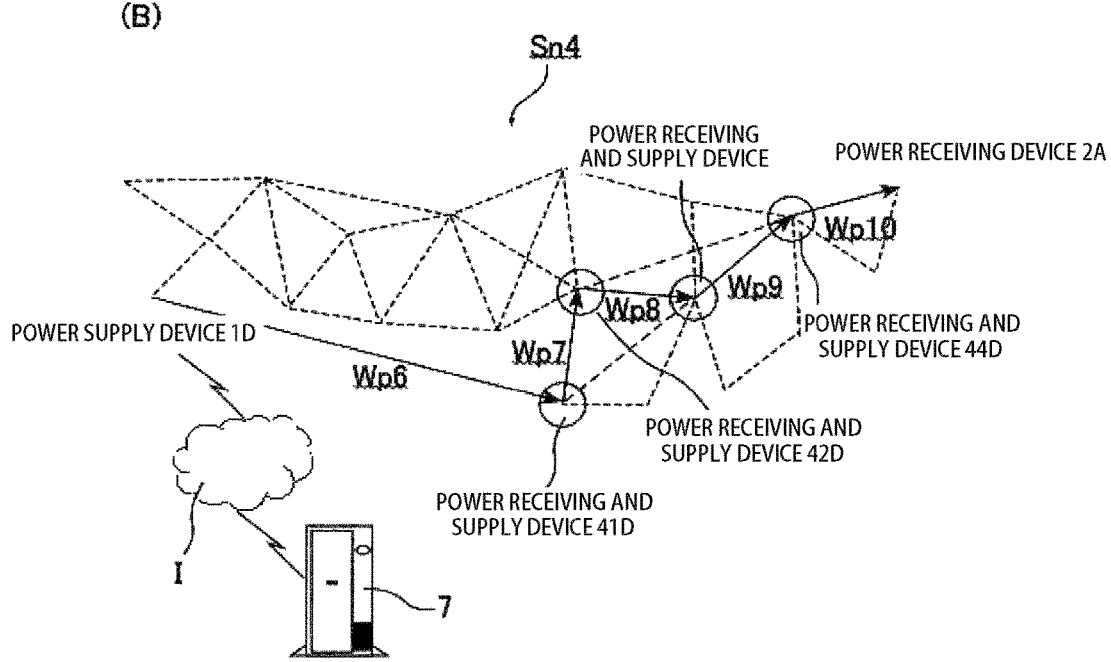

FIGS. 30 to 32 are schematic diagrams each illustrating a twelfth embodiment of the power supply system. The power supply system of the present embodiment includes an arithmetic unit that calculates a route to form a power supply network in which electrical power is supplied from a power supply device to a power receiving device via a plurality of power receiving and supply devices (nodes). The arithmetic unit may have a dedicated server, or may be a unit that performs calculation using P2P communication (the arithmetic unit is not shown in the present embodiment).

FIG. 30 is a schematic diagram illustrating a supply system Sn1 based on selection of a shortest path of the power supply system. The arithmetic unit calculates a route having a shortest distance among the power supply routes from a power supply device 1A to a power receiving device 2A. The shortest distance may be calculated using a known algorithm (e.g., Dijkstra's algorithm). The shortest distance may dynamically change due to installation of a new node; however, the shortest distance can be fixedly set in advance because a power supply route can basically be confirmed prior to power supply. In the present embodiment, a shortest distance power supply network Sn1 is formed by paths W1, W2, W3 and W4 between the power supply device 1A and the power receiving device 2A via power receiving and supply devices 41A, 42A and 43A. The power receiving and supply devices 41A to 43A can receive transaction fees involved in the power supply (the same applies to the modes shown in FIGS. 31 and 32). In this mode, a long-distance power supply route can be formed by short-distance units to improve power supply efficiency.

FIG. 31 shows a mode in which paths in a power supply network Sn2 dynamically change. The arithmetic unit selects a path W1 from a power supply device 11B as an optimum power supply route to the power receiving device 2A at time t1 (FIG. 31(A)), selects paths W2 and W3 via the power receiving and supply devices 41B and 42B as an optimum power supply route at time t2 (FIG. 31(B)), and selects paths W4, W5, W2 and W3 via a power supply device 12B and the power receiving and supply devices 43B, 41B and 42B as an optimum power supply route at time t3.

In the present embodiment, the arithmetic unit measures power consumption in the plurality of routes of the power supply network Sn2 and dynamically changes route based on data on available supply power. Therefore, routes are dynamically changed as time passes from time t1 to time t3. In the present embodiment, at least power receiving and supply devices located on a route are brought into a standby state as nodes and therefore include respective storage units. In particular, if demand prediction of the entire power supply network is improved, an optimum amount of electrical power can be stored and power supply efficiency can be improved. In particular, power supply efficiency can be improved when performing multiple-to-multiple power supply.

FIG. 32 is a set of schematic diagrams each illustrating a supply network based on route selection according to the priority requirements of the power supply system. FIG. 32(A) is a schematic diagram illustrating a power supply network Sn3 for route selection according to the priority requirement on the power receiving device 2A side. For example, if the priority requirement on the power receiving device 2A side is to prioritize power supply of a renewable energy promotion company, the arithmetic unit performs route selection according to this priority requirement (This is an application of the configuration described referring to FIGS. 14 and 15 to the route selection of the entire power supply network). In the present embodiment, when the power receiving device 2A sets a predetermined priority requirement, the arithmetic unit selects paths Wp1, Wp2, Wp3 and Wp4 via a power supply device 1C and power receiving and supply devices 41C, 42C, 43C and 44C.

FIG. 32(B) is a schematic diagram illustrating a power supply network Sn4 for route selection according to the priority requirement on a power supply device 1D side. For example, if the power supply device 1D is connected to a weather forecast server 7 via the Internet I, and information (a signal) related to a disaster forecast for the area where the power receiving device 2A is located is received from the server 7, the arithmetic unit is triggered by the signal reception and calculates an optimal route from the power supply device 1D to the power receiving device 2A. In the present embodiment, when the power supply device 1D sets a predetermined priority requirement, the arithmetic unit selects paths Wp6, Wp7, Wp8, Wp9 and Wp10 via a power supply device 1D and power receiving and supply devices 41D, 42D, 43D and 44D.

In the present embodiment, the signal from the server 7 is used as a trigger for starting the arithmetic unit; however, the arithmetic unit may be started without relying on a signal from an external device to set the priority requirement. It should be noted that the power receiving and supply device 44D may be, for example, a device installed in a medical facility or disaster headquarters, or may be a device installed in a public shelter, or in other places.

As described above, the power supply device and the power supply system according to the disclosure of the present specification transmit an electrical signal after being encoded, and therefore have high robustness, and can perform power supply at a high SN ratio. Furthermore, the encoding enables transmission of a plurality of electrical signals without interference, and therefore the power supply device and the power supply system according to the disclosure of the present specification can enhance fading resistance and thus is suitable for radiative wireless power transmission between a plurality of moving objects (multiple-to-one, one-to-multiple, or multiple-to-multiple).

REFERENCE SIGNS LIST

1 Power supply device
2 Power receiving device
11 Baseband unit
12 Modulation processing unit
13 Transmission unit
14 Information generation unit
15 Power supply side reception unit
21 Reception unit
22 Demodulation processing unit
23 Loading unit
24 Display unit
25 Decryption processing unit
26 Setting unit
27 Power receiving side transmission unit

The invention claimed is:

1. A power supply device configured to transmit a power signal to a power receiving device to supply electrical power thereto and perform transmission and reception of data related to the power signal transmission, comprising:
    a baseband unit that generates the power signal;
    a modulation processing unit that modulates the power signal generated by the baseband unit to impart a code thereto for specifying a transmission source of the power signal, and generates a modulated signal that can be demodulated by the power receiving device; and
    a transmission unit that transmits a modulated signal generated by the modulation processing unit to the power receiving device using contactless transmission, wherein
    the modulation processing unit includes,
    a transmission side code generation unit that generates a complex spreading code to be shared with the power receiving unit, from a primitive root of a predetermined prime number and an identification number of an integer for generating a constant-power chaotic spreading code, and multiplies the complex spreading code with the power signal to generate a constant-power chaotic spreading code as the code for specifying a transmission source through spread spectrum modulation processing; and
    a complex spreading unit that spreads the power signal using the complex spreading code.

2. The power supply device according to claim 1, wherein
    the modulation processing unit imparts a spreading code, as the spreading code, to the power signal generated by the baseband unit, the spreading code using K almost periodic frequencies each determined by a parameter expressed by $\delta+(k-1)/K$, for multiplication with the power signal and generates a modulated signal that can be demodulated by the power receiving device; and
    the transmission unit transmits the modulated signal generated by the modulation processing unit to the power receiving device using contactless transmission,
    where, k is an integer from 1 to K serving as an identifier for identifying K almost periodic function codes, and K is N or 2N (N is a code length of an almost periodic function code), and $\delta$ is a real number that is more than 0 and less than $1/N$.

3. The power supply device according to claim 1 that causes the modulation processing unit to perform transmission using a multicarrier signal having an almost periodic function arrangement as a frequency arrangement to generate the modulated signal by an almost periodic function for specifying a power signal 34 of at least one transmission source, the modulation processing unit including
    a serial/parallel conversion unit that converts the power signal that is a serial code into a parallel code having a parallel number corresponding to predetermined multiplex code length;
    a subcarrier conversion unit that performs subcarrier modulation for the parallel code having predetermined multiplex code length, and outputs a multicarrier signal having an almost periodic frequency arrangement indicated by a code string transmitted by the transmission unit; and
    an almost periodic function arrangement generation unit that provides a multicarrier signal to the subcarrier modulation unit, wherein
    the transmission unit allocates subcarrier signals, in a predetermined frequency band, to a plurality of subcarriers different from each other to transmit the multicarrier signal as an almost periodic frequency subcarrier synthesized signal.

4. The power supply device according to claim 3, wherein the power signal has a predetermined almost periodic frequency that is a magnetic field resonance type resonance frequency in the modulation processing unit.

5. The power supply device according to claim 1, comprising a power supply side reception unit that receives a power supply request signal from the power receiving device, wherein a circuit for issuing the power supply signal generated by the baseband unit commences in response to the power supply request signal being received.

6. A power supply system comprising:
the power supply device according to claim 1, the power supply device including a baseband unit that generates a power signal, a modulation processing unit that modulates the power signal generated by the baseband unit to impart a code thereto for specifying a transmission source of the power signal and generates a modulated signal that can be demodulated by a power receiving device, and a transmission unit that transmits a modulated signal generated by the modulation processing unit; and
a power receiving device including a reception unit that receives the modulated signal via a predetermined transmission line, a demodulation processing unit that performs demodulation processing for the received modulated signal, and a loading unit that receives the power signal obtained through the demodulation processing.

7. The power supply system according to claim 6, wherein the power supply device and the power receiving device is a moving object, and the power supply device simultaneously transmits power signals to a plurality of moving objects including the similar moving object traveling.

8. The power supply system according to claim 7, comprising a plurality of power supply base stations located between the power supply device and the similar moving object, the plurality of power supply base stations being mutually capable of transmission and reception of the power signal and being connected to each other via an information and communication network.

9. The power supply system according to claim 8, wherein the power receiving device includes a power receiving side transmission unit that transmits a power supply request signal to the power supply device;
the power supply device includes a power supply side reception unit that receives the power supply request signal; and
a circuit for issuing the power supply signal generated by the baseband unit commences in response to the power supply side reception unit receiving the power supply request signal.

10. The power supply system according to claim 9, wherein the power supply request signal is transmitted in response to at least a state of charge of the power receiving device or a predetermined operating time of the power receiving device having reached a predetermined threshold.

11. The power supply system according to claim 6, wherein the power supply device includes
an authentication processing unit that requests the power receiving device to issue authentication information for power reception and performs authentication processing in response to the authentication information being received from the power receiving device; and
a power supply condition processing unit that changes power supply conditions among power receiving devices depending on whether the power receiving devices are authenticated or not authenticated as a result of the authentication processing.

12. The power supply system according to claim 7, wherein
the power supply device includes an information generation unit that generates a predetermined information signal related to the power signal;
the power receiving device includes a display unity that displays the information signal;
the information signal includes at least any one of a transmission source information signal, an electrical energy information signal, a billing information signal, and an environmental value information signal and includes an encrypted signal; and
the power receiving device that has received the encrypted signal includes a decryption processing unit that decrypts the encrypted signal.

13. The power supply system according to claim 12, wherein
the information signal includes a power supply condition information signal; and
the power receiving device that has received the power supply condition information signal includes a setting unit that receives only a power signal transmitted with a predetermined power supply condition information signal.

14. The power supply system according to claim 7, wherein the power supply device includes a selection unit which, in response to reception of power receiving side status information transmitted from the power receiving device, checks the power receiving side status information against power supply side status information held by the power supply device, and selects a power receiving device that has transmitted the power receiving side status information having a predetermined relation with the power supply side status information, to transmit the power signal to the selected power receiving device.

15. The power supply system according to claim 7, comprising a power receiving and supply device that is configured to receive electrical power from the power supply device and supply received electrical power to another power receiving device.

16. The power supply system according to claim 15, wherein,
the power receiving and supply device includes a storage unit that stores a part or all of the received electrical power, and includes at least
a log information generation unit that generates power receiving source information, an amount of received power, power supply destination information, and an amount of supplied power at predetermined time intervals; and
a calculation unit that calculates a difference between the amount of received power and the amount of supplied power.

17. The power supply system according to claim 15, wherein
a plurality of clusters are formed for each predetermined area, each cluster including a plurality of power supply devices, power receiving devices, and power receiving and supply devices; and
the power supply system includes a collection unit that collects supply power from each cluster unit, and a distribution control unit that supplies the collected supply power to other clusters.

18. The power supply system according to claim 17, comprising
a storage unit that supplies electrical power to data detection units installed in respective power supply devices, power receiving devices, and power receiving and supply devices forming the clusters so that the data detection units are constantly in operation, and stores data detected by the data detection units; and
a power demand prediction unit that predicts excess/deficiency data of electrical power of a cluster unit based on the stored data, wherein
the distribution control unit supplies electrical power to the clusters based on the excess/deficiency data predicted by the power demand prediction unit.

19. The power supply system according to claim 15, comprising an arithmetic unit that calculates a route to form a power supply network in which electrical power is supplied from the power supply device to the power receiving device via the plurality of power receiving and supply devices.

20. The power supply system according to claim 19, wherein the arithmetic unit calculates a route of a shortest distance from the power supply device to the power receiving device for the power supply network, measures power consumption for each of a plurality of routes of the power supply network, and dynamically changes routes based on data on available supply power.

* * * * *